(12) United States Patent
Hamaker et al.

(10) Patent No.: US 9,684,641 B1
(45) Date of Patent: Jun. 20, 2017

(54) PRESENTING CONTENT IN MULTIPLE LANGUAGES

(71) Applicant: Amazon Technologies, Inc., Reno, NV (US)

(72) Inventors: Janna S. Hamaker, Seattle, WA (US); Tom Killalea, Seattle, WA (US); Abhishek Patnia, Seattle, WA (US)

(73) Assignee: Amazon Technologies, Inc., Reno, NV (US)

( * ) Notice: Subject to any disclaimer, the term of this patent is extended or adjusted under 35 U.S.C. 154(b) by 570 days.

(21) Appl. No.: 13/624,092

(22) Filed: Sep. 21, 2012

(51) Int. Cl.
   *G06F 17/00* (2006.01)
   *G06F 17/22* (2006.01)

(52) U.S. Cl.
   CPC ................................ *G06F 17/2288* (2013.01)

(58) Field of Classification Search
   CPC ... G06Q 10/10; G06F 17/30011; G06F 17/24; G06F 17/28; G06F 17/00; G06F 17/241; G06F 17/30746; G06F 17/2827; G06F 3/04886; G06F 17/30861; G06F 17/289; G06F 17/2288; G10L 15/265; G10L 15/22
   USPC .......................................... 715/229; 704/235
   See application file for complete search history.

(56) References Cited

U.S. PATENT DOCUMENTS

| | | | |
|---|---|---|---|
| 5,351,189 A * | 9/1994 | Doi ..................... | G06F 17/2836 345/685 |
| 6,370,498 B1 * | 4/2002 | Flores et al. ...................... | 704/3 |
| 7,801,721 B2 * | 9/2010 | Rosart et al. ..................... | 704/8 |
| 7,890,882 B1 * | 2/2011 | Nelson .......................... | 715/788 |
| 8,364,464 B2 * | 1/2013 | Elgazzar et al. .................. | 704/2 |
| 8,412,509 B1 * | 4/2013 | Pearson et al. ................... | 704/2 |
| 8,826,169 B1 * | 9/2014 | Yacoub et al. ................ | 715/776 |
| 2005/0119977 A1 * | 6/2005 | Raciborski ....................... | 705/59 |
| 2005/0171758 A1 * | 8/2005 | Palmquist .............. | G10L 15/26 704/4 |
| 2005/0216251 A1 * | 9/2005 | Dorius ............................. | 704/2 |
| 2008/0076103 A1 * | 3/2008 | Wallace ........................ | 434/317 |
| 2011/0097693 A1 * | 4/2011 | Crawford ............... | G09B 5/065 434/157 |
| 2012/0197998 A1 * | 8/2012 | Kessel et al. ................. | 709/205 |
| 2012/0310642 A1 * | 12/2012 | Cao .......................... | G10L 13/00 704/235 |
| 2012/0310649 A1 * | 12/2012 | Cannistraro ............ | G10L 13/00 704/260 |
| 2013/0041747 A1 * | 2/2013 | Anderson et al. ......... | 705/14.39 |

(Continued)

*Primary Examiner* — Scott Baderman
*Assistant Examiner* — Jason Edwards
(74) *Attorney, Agent, or Firm* — Lee & Hayes, PLLC

(57) ABSTRACT

In some examples, an electronic device may present a portion of a content item in a first language contemporaneously with a corresponding portion in a second language. Thus, a user may view the portion of content in the first language and the same portion of content in the second language. Further, the electronic device may dynamically adjust an area allotted to displaying each language version, such as in the case that a portion of content in one language takes up more space than a matching portion of content in the other language. In some examples, metadata for multiple language versions of a content item may include mapping information for correlating a portion of the first language version of the content item with a matching or corresponding portion of the second language version of the content item based, at least in part, on location information.

31 Claims, 17 Drawing Sheets

(56) References Cited

U.S. PATENT DOCUMENTS

2014/0003792 A1* 1/2014 Soroushian .................. 386/244
2014/0250219 A1* 9/2014 Hwang ........................ 709/224

* cited by examiner

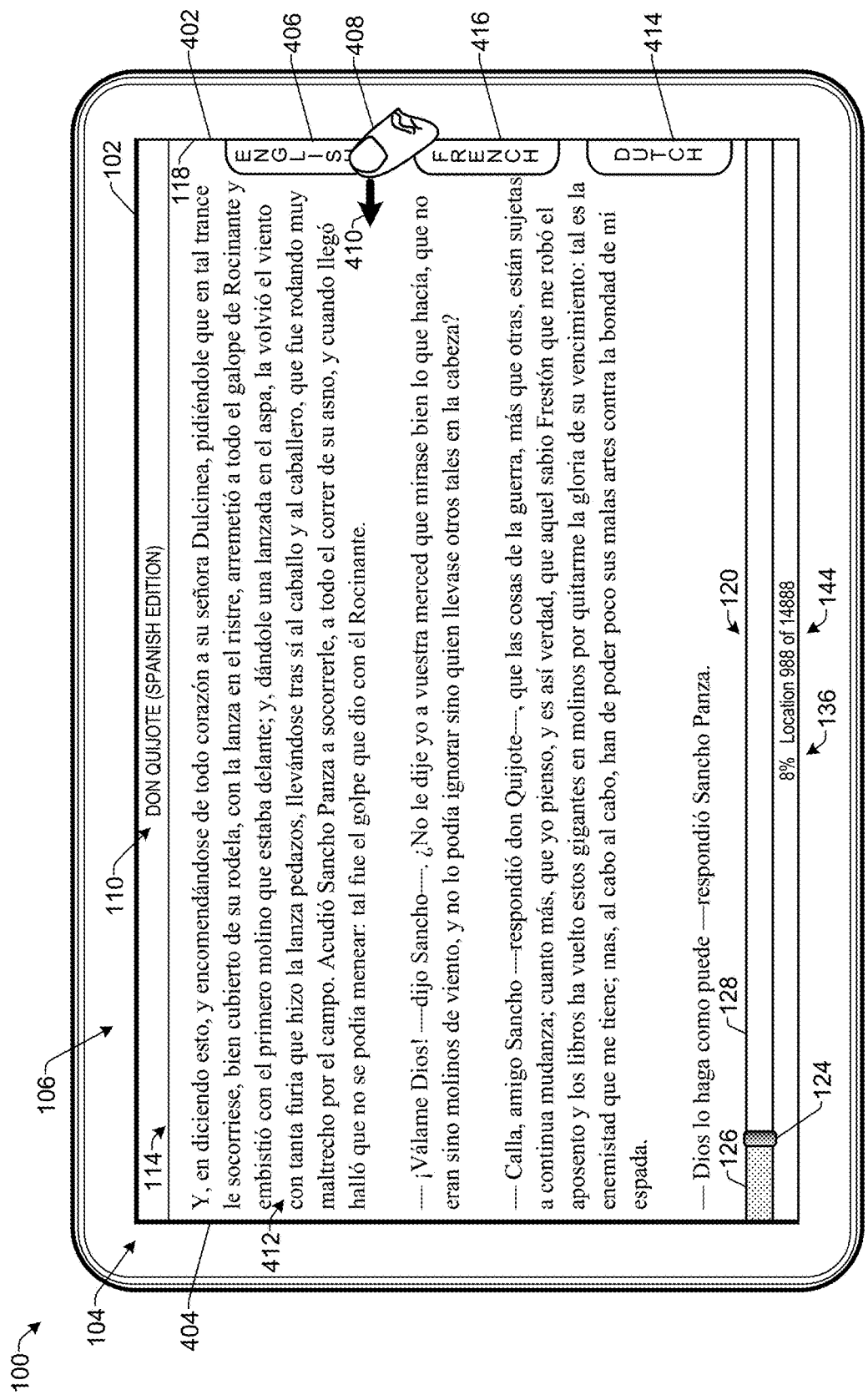

FIG. 5

DON QUIJOTE (SPANISH EDITION) 114 118-1

Y, en diciendo esto, y encomendándose de todo corazón a su señora Dulcinea, pidiéndole que en tal trance le socorriese, con la lanza en el ristre, cubierto de su rodela, arremetió a todo el galope de Rocinante y embistió con el primero molino que estaba delante; y, dándole una lanzada en el aspa, la volvió el viento con tanta furia que hizo la lanza pedazos, llevándose tras sí al caballo y al caballero, que fue rodando muy maltrecho por el campo.

8% Location 988 of 14888

DON QUICHOT (DUTCH EDITION) 502 118-2

Met deze woorden maakte hij zich tot den kamp gereed, dacht aan zijn hooge gebiedster Dulcinea van Toboso, riep hare machtige bescherming tegen het dreigende gevaar in, dekte zijn borst met het schild, velde de lans, stoof in wilden galop vooruit en richtte onversaagd zijn aanval op den naastbij staanden windmolen. De scherpe lans ging door een der wieken heen, welke de wind juist op dat oogenblik met vermeerderde snelheid ronddraaide; zij brak dadelijk in stukken, terwijl ruiter en ros overhoop geworpen en, leelijk bezeerd en gekneusd, een eind ver weggeslingerd werden.

10% Location 1635 of 16892

DON QUIXOTE 116

So saying, and commending himself with all his heart to his lady Dulcinea, imploring her to support him in such a peril, with lance in rest and covered by his buckler, he charged at Rocinante's fullest gallop and fell upon the first mill that stood in front of him; but as he drove his lance-point into the sail the wind whirled it round with such force that it shivered the lance to pieces, sweeping with it horse and rider, who went rolling over on the plain, in a sorry condition.

10% Location 1542 of 15647

FRENCH

1300 ─↘

```
┌─────────────────────────────────────────────────────────────┐
│ RECEIVE A FIRST TEXT PORTION OF A FIRST VERSION OF A CONTENT│
│  ITEM IN A FIRST LANGUAGE AND A SECOND TEXT PORTION OF A    │
│  SECOND VERSION OF THE CONTENT ITEM IN A SECOND LANGUAGE    │
│                            1302                             │
└─────────────────────────────────────────────────────────────┘
                              ↓
┌─────────────────────────────────────────────────────────────┐
│   DETERMINE LOCATION INFORMATION ASSOCIATED WITH THE FIRST  │
│          TEXT PORTION AND THE SECOND TEXT PORTION           │
│                            1304                             │
└─────────────────────────────────────────────────────────────┘
                              ↓
┌─────────────────────────────────────────────────────────────┐
│   COMPARE ONE OR MORE WORDS FROM THE FIRST TEXT PORTION     │
│  WITH ONE OR MORE WORDS FROM THE SECOND TEXT PORTION TO     │
│  FIND WORD OR PHRASE CORRELATIONS BETWEEN THE FIRST AND     │
│                    SECOND TEXT PORTIONS                     │
│                            1306                             │
└─────────────────────────────────────────────────────────────┘
                              ↓
┌─────────────────────────────────────────────────────────────┐
│  BASED AT LEAST IN PART ON THE COMPARING, CREATE A MAPPING  │
│    THAT INDICATES ONE OR MORE CORRESPONDING LOCATIONS       │
│ BETWEEN THE FIRST TEXT PORTION IN THE FIRST LANGUAGE AND THE│
│       SECOND TEXT PORTION IN THE SECOND LANGUAGE            │
│                            1308                             │
└─────────────────────────────────────────────────────────────┘
```

FIG. 13

PRESENTING CONTENT IN MULTIPLE LANGUAGES

BACKGROUND

The continued proliferation of digital content items has led to an increase in the availability of such content items, as well as an increase in the availability of electronic devices and applications used for consuming these content items. For instance, users may consume textual content items, such as electronic books (eBooks) and other types of textual content items on an assortment of electronic devices. As the number of textual content items and devices for consuming textual content items continues to increase, users are ever more interested in enhancing their experiences while consuming these content items. For example, content items may be available in a variety of different languages. Thus, some users may be interested in consuming content items in more than just one language. For instance, users may consume content items in multiple languages to improve their fluency in a target language, to review the quality of a translation, or for various other reasons.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

FIG. 4 illustrates an example interface for presenting a content item in multiple languages according to some implementations.

FIG. 5 illustrates an example interface for presenting a content item in three or more languages according to some implementations.

FIG. 13 is a flow diagram illustrating an example process that may be executed by an electronic device or by a content provider computing device for multiple language versions of a content item according to some implementations.

DETAILED DESCRIPTION

Figure 1:
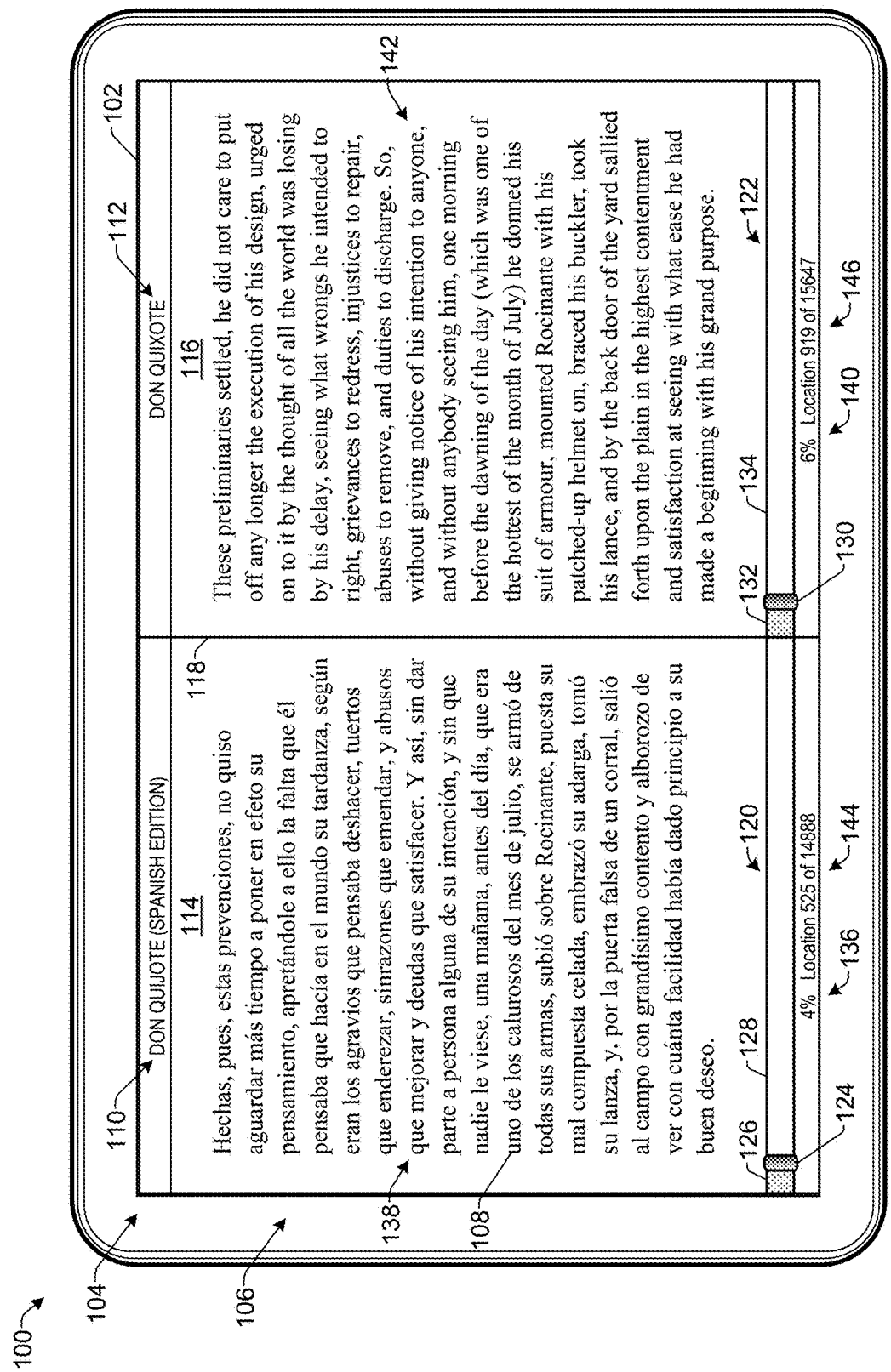
FIG. 1 illustrates an example interface for presenting a content item in multiple languages according to some implementations.

This disclosure includes techniques and arrangements for presenting content of a digital content item. For instance, an electronic device may present content, such as text, of a content item on a display associated with the electronic device. In some examples, a user of the electronic device may elect to have the content item presented in a first language version and in a second language version contemporaneously on the display. For example, the electronic device may display a portion of the content item in a first language adjacent to a matching or corresponding portion in a second language. Thus, the user may view, read, play, or otherwise consume the portion of content in the first language and the same portion of content in the second language.

As one example, suppose that a user of an electronic device is reading a content item, such as an electronic book (eBook) in a first language, and also wishes to view the content item in a second language. The user may obtain the version of the content item in the second language, and the electronic device may present the version in the second language on the display adjacent to the version in the first language. For instance, the electronic device may determine a position of the portion of content from the first language version that is currently presented on the display, and based on the determined position, may locate and present a corresponding portion of content from the second portion. Thus, the user is able to view the same portion of content in the two different languages presented contemporaneously on the display.

Further, the user may select one or more terms from the text, such as character names, place names, topics, etc., to be visually distinguished in both versions of the content, such as to provide anchor points when comparing the portions of content in the two different languages. Additionally, in some cases, the electronic device may dynamically adjust an area allotted to display of each language version in the case that a portion of content in one language is more verbose, or otherwise takes up more space than a matching portion of content in the other language.

In addition, the user may be able to reduce in size or hide completely an area containing one of the displayed language versions. A control may be provided to enable the user to easily re-display the hidden version, such as if the user is unable to determine the meaning of one or more words in the other language version. When the hidden version is re-displayed, the electronic device may automatically display a portion of content that corresponds to the currently displayed portion in the other language, regardless of how far the user has progressed through the content item since hiding one of the language versions.

In some examples, a content provider may provide metadata for multiple language versions of a content item that may include position or mapping information for correlating a portion of a first language version of the content item with a matching or corresponding portion of a second language version of the content item. For example, the content provider may index the various text components or text portions of the first version in the first language, such as by associating first location information with the various text portions. The content provider may further index the various text components or text portions of the second version in the second language, such as by associating location information with the various text portions of the second version. The content provider may then compare one or more text portions from the first version with one or more text portions from the second version to find correlations. Based at least in part on the comparing, the content provider may create a mapping that indicates one or more corresponding locations between content of the first version in the first language and content of the second version in the second language.

For discussion purposes, some example implementations are described in the environment of presenting content, such as text, images, audio content, or the like, in connection with an eBook or other content item. However, the implementations herein are not limited to the particular examples provided, and may be extended to other types of content items, other types of content configurations, and other interface configurations, as will be apparent to those of skill in the art in light of the disclosure herein.

Example Interfaces

FIG. 1 illustrates an example electronic device 100 able to present a content item in multiple languages according to some implementations. The electronic device 100 may be implemented as any of a number of different types of electronic devices, as discussed further below. The electronic device 100 may include, or may have associated therewith, a display 102 to present an interface 104 for displaying a content item 106. In some types of electronic devices 100, the display 102 may be a touch-sensitive display configured with a sensor to sense a touch input received from an input effecter, such as a finger of a user, a stylus, or the like. Thus, the touch-sensitive display may receive one or more touch inputs, stylus inputs, selections of text, and so forth.

In other implementations, the display 102 may be non-touch sensitive. Accordingly, in addition to, or as an alternative to, a touch sensitive display, the electronic device 100 may include various external controls and input devices. For example, some implementations (not shown in FIG. 1) of the electronic device 100 may include a virtual or physical keyboard, a mouse, a pointing stick, a touchpad, a trackball, a joystick, a remote control, buttons and/or various other controls for performing various desired inputs and interactions with the electronic device 100 and the content item 106 presented on the display 102. Additionally, in some implementations, one or more voice commands may be used to control or interact with the content items or interfaces herein. Further, in some examples, a user's eye position or point of focus may be detected to serve as inputs or commands. Thus, implementations herein are not limited to any type of input devices, techniques, or controls.

In some cases, the content item 106 may be a book or electronic book (eBook) including text 108, such as one or more pages of text. For example, the display 102 may present the text 108 of an eBook and any images, illustrations, tables, maps, or graphic elements that might be contained in the eBook. The terms "book" and/or "eBook," as used herein, may broadly include electronic or digital representations of printed works, as well as digital content that may include text, multimedia, hypertext, and/or hypermedia. Examples of content items 106 may include, but are not limited to, electronic versions of books, magazines, newspapers, periodicals, journals, reference materials, textbooks, anthologies, instruction manuals, proceedings of meetings, forms, directories, web pages, plays, screen plays, closed captioning transcripts of movies and television shows, song lyrics, and so forth, as well as other types of content items including text that the user may view or interact with using the electronic device 100. Accordingly, a content item 106 may include any readable or viewable textual content that is in electronic or digital form. Additionally, in some examples, the content item may 106 include audio content, such as in the case of an audio book or narrative, computer-generated speech, as well as other types of multimedia content.

In the illustrated example of FIG. 1, suppose that a content item 106 that a user is currently consuming is an eBook version of Don Quixote by Miguel de Cervantes. For instance, the user may be a native English speaker, but may be reading the Spanish edition of the content item 106, such as to learn or practice Spanish language skills. Accordingly, the user may activate, or otherwise cause to appear, the interface 104, which includes presentation of a first or Spanish-language version 110 and an adjacent presentation of a second or English language version 112 of the content item 106. For example, the Spanish language version 110 may be presented in a first portion or area 114 of the display 102, and the English language version 112 may be presented in a second portion or area 116 of the display 102. The two versions 110, 112 may be displayed adjacent to one another in any suitable manner, such as in a side-by-side fashion, one above the other, in portrait or landscape mode, or the like.

Furthermore, the first area 114 may be separated from the second area 116 by a spine or divider 118, which may be a line or other graphic element that serves as a boundary between the first area 114 and the second area 116. In some examples, the divider 118 may remain stationary in a central location between the first area 114 and a second area 116 as the user progresses through the content item. In other examples, as discussed below, the divider 118 may move or change location dynamically, such by moving to the left or the right of the central location, based upon the amount of content contained in each respective area 114 or 116 at any point during the consumption of the content item 106.

Additionally, the interface 104 may include at least one progress bar or consumption representation that may be visible or that may become visible as a result of an action performed by the user. In the illustrated example, the interface 104 includes a first consumption representation 120 corresponding to reading progress through the first version 110 of the content item and a second progress representation 122 corresponding to reading progress through the second version 112 of the content item 106. The consumption representation 120 may include a handle 124 that may be moved along the consumption representation 120, such as by user action, to navigate within the content item to present a different portion of the content item 106.

In some examples, the progress representations 120, 122 may have a length that corresponds to an expanse of the content of each respective version of the content item 106. For instance, the handle 120 may be positioned in a location on the consumption representation 120 that is proportional to a portion of content currently displayed within the expanse of content of the first version 110 of the content item. Additionally, in some examples, the consumption representation 120 may include one or more portions 126 that are visually distinguished from one or more portions 128. For example, the one or more visually distinguished portions 126 may represent portions of the first version 110 that have been read or otherwise consumed by the user. Similarly, the second consumption representation 122 may represent a current consumption location in the second version 112 of the content item 106. The second consumption representation 122 may include a handle 130 and one or more visually distinguish portions 132 that are visually distinguished from one or more other portions 134 of the consumption representation 122. Alternatively, the interface 104 may include one or more vertical scrollbars in addition to, or as an alternative to, the consumption representations 120, 122. For example, if a scrollbar is used to advance through the content, the content may advance in matched discrete portions of text so that at any point in the advancement, the text displayed in the first language corresponds to the text displayed in the second language.

In addition to the consumption representations 120, 122, or as an alternative, the interface 104 may present percentage indicators 136 and 140, respectively. For example, the percentage indicator 136 indicates that the currently presented portion of content of the first version is 4% of the way through the total expanse of content of the first version 110. Similarly, the second percentage indicator 140 indicates that the currently presented portion of content of the second version is 6% of the way through the total expanse of content of the second version 112. Thus, the percentage indicators may indicate an amount consumed up to a current location as a percentage of a total amount of content of each version 110, 112 of the content item.

Furthermore, the quantity of content of the two versions 110, 112 of the content item 106 may not match up exactly with one another. For instance, an introduction or forward by a translator may be included in one of the versions, or other content may be included that is particular to one version in a first language and not included in a version in a second language. Accordingly, in the illustrated example, the first indicator 136 indicates the current location of the presented portion 138 of Spanish-language content as a percentage of a total amount of the content is only 4%, while the second indicator 140 indicates the current location of the currently presented portion 142 of the English-language version 112 is 6% of the total for that version, even though the two portions 138, 142 present the same portion of content of the content item 106.

In addition, the interface 104 may display a current location indictor 144 corresponding to an allotted position or location number for the current Spanish-language portion of content 138 out of a total number of allotted location numbers in the Spanish-language version 110. Similarly, the interface 104 may display a current location indicator 146 correspond to an allotted position or location number for the current English-language portion of content 142 out of a total number of allotted location numbers for the English language version 112. Thus, in some implementations herein, rather than using page numbers, the user interface 104 may be rendered based on location numbers determined for each version 110, 112 of the content item 106.

In some devices or platforms, a content item may not be displayed with page numbers or may not have page numbers associated therewith. Additionally, because various different display conditions may exist during the rendering of a content item 106 on various different devices having various different display sizes and resolutions, page numbering may not apply to a content item on some devices or platforms. In such a case, the content provider may use invariant referencing to assign location numbers to parts of the content item 106. The location numbers may remain constant for the parts of the content item regardless of a screen size, font type, font size or other variations in the display conditions of the digital work. Additional information on assigning location numbers to parts of a content item is provided in U.S. Pat. No. 7,865,817 to Ryan et al., the entire disclosure of which is incorporated herein by reference.

In addition, or as an alternative, the location indicators 144, 146 may also display a page number (not shown in FIG. 1), such as a page number from a corresponding print version of the content item 106, that corresponds to a currently-displayed portion 138, 142 of the content item. For instance, the electronic device 100 may correlate a currently displayed portion 138, 142 with a particular page of the corresponding print version of the content item, and may display a page number on which the currently displayed portion is located, regardless of whether an entire page of the content item is displayed in the interface 104. Accordingly, the location indicators 144, 146 may include a corresponding current page number out of a total number of pages in the content item 106 in addition to, or as an alternative to, the invariant location numbers illustrated in FIG. 1.

In the example of FIG. 1, suppose that the user has progressed through the content item 106 and that the currently displayed Spanish portion of content 138 occurs at a location that is approximately 4% of the way through the content of the Spanish-language version 110, and is at a location 525 of 14888 locations. However, the corresponding currently displayed English-language portion of content 142 occurs at a location that is 6% of the way through the English-language version 112 of the content item 106, and is at a location 919 of 15647 locations. Consequently, the English-language version 112 may include content at the beginning of the content item that is not included in the Spanish-language version. Additionally, or alternatively, one language may include more words or characters to express the same content. Thus, merely aligning pages or location numbers of the two versions 110, 112 of the content item 106 may not provide a useful comparison to the user. Accordingly, as discussed additionally below, the electronic device 100 may access mapping information that maps portions of the Spanish-language version 110 to corresponding portions of the English language version 112 or vice versa. Therefore, when the user navigates through the content item, the electronic device 100 may present in the interface 104 portions of the two versions 110, 112 that match or correspond to one another by containing the same substance.

As an example, suppose that the user is reading the Spanish-language version 110 on the left side of the display 102 and may occasionally refer to the English language version 112 on the right side of the display 102 when unsure about the meaning of a particular Spanish word or when otherwise having difficulty in understanding the Spanish-language content portion 138. When the user reaches the end of the Spanish language content portion 138, the user may enter an input to move on to a next page or portion of the content item 106, such as by performing a swipe in the case that the display 102 is touch sensitive, or by performing a different type of input to indicate a page change, depending on the type of the electronic device 100. Thus, when the user moves on to the next portion of the Spanish-language version 110, the English-language version may be updated automatically in the area 116 to display a corresponding portion of the English language content. Furthermore, the amount of content displayed in each area 114, 116 may be automatically adjusted so that the portion displayed in the English language matches up with the portion displayed in the Spanish-language and vice versa. Or, in other words, based on the amount of areas 114, 116 available, the electronic device may dynamically adjust the amount of content presented so that one area 114 of the display 102 does not present more content than the other area 116 of the display 102. For example, if one of areas 114, 116 displayed an additional portion of the content, such as a next sentence, that did not have a corresponding translation displayed in the other one of areas 114, 116, this may cause confusion to the user. Consequently, some implementations herein may leave whitespace in one area 114, 116 to ensure that the content portions presented match up with one another.

Figure 2:
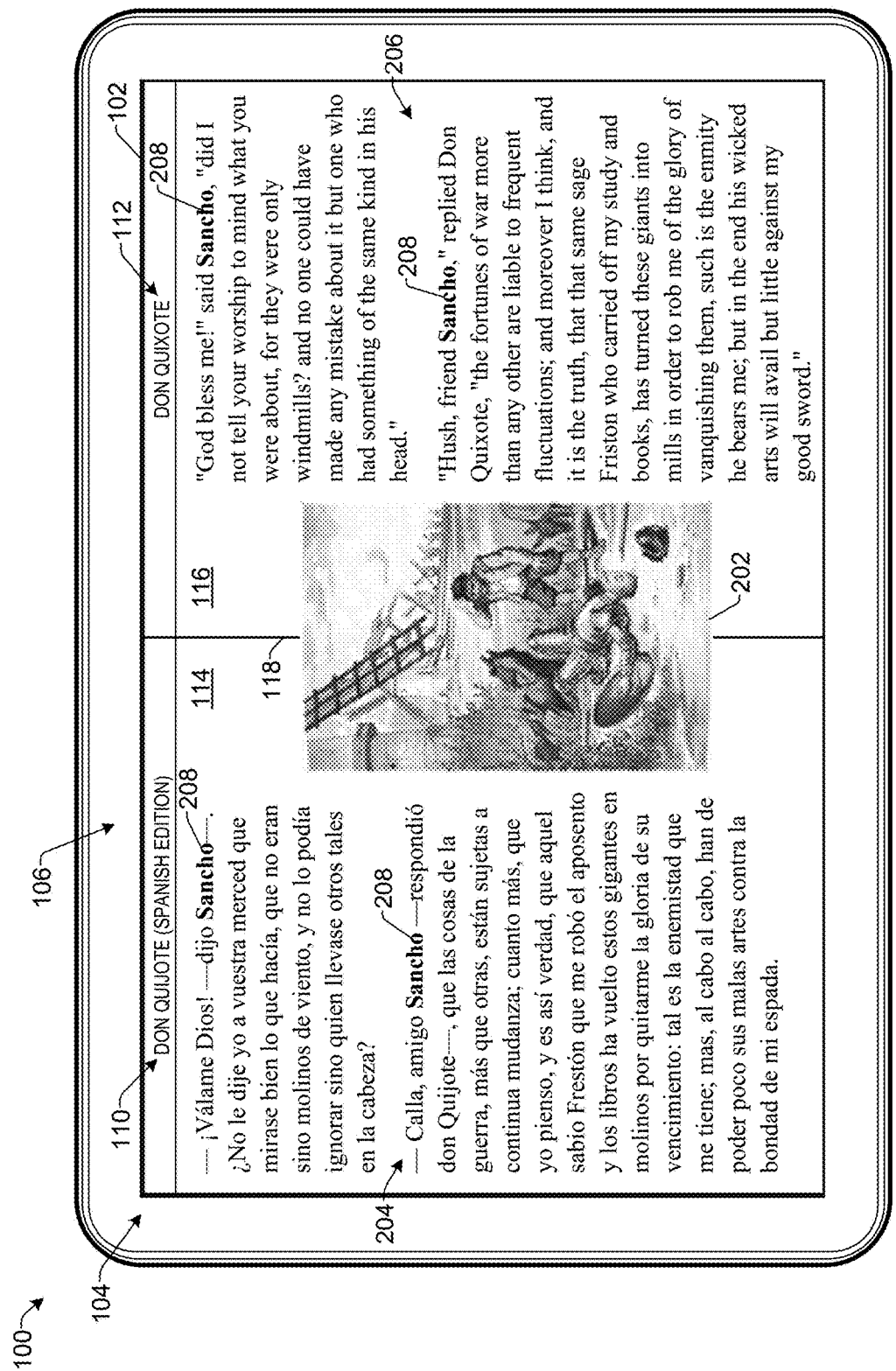
FIG. 2 illustrates an example interface for presenting a content item, including an image, in multiple languages according to some implementations.

FIG. 2 illustrates an example of the interface 104 when presenting a content item including an image according to some implementations. In this example, suppose that the content item 106 includes an image 202, such as a drawing, figure, photograph, graph, chart, table, or the like, that corresponds to a particular part of the content item 106. Rather than presenting the image twice, i.e., in both the first area 114 and the second area 116, the interface 104 may present the image only once, such as centered between a first-language portion 204 and a corresponding second-language portion 206 that also corresponds to the image 202. Thus, in this example, the image 202 may be centered along the divider 118. Alternatively, in other examples, the image 202 may be located to the right, to the left, above, or below of one of the areas 114, 116. For example, the areas 114, 116 may be compressed toward the left or the right to provide room for presenting the image 202. Similarly, the areas 114, 116 may be compressed upward or downward to provide room to present the image 202 on the display 102. As still another example, the image 202 may be presented in one of the areas 114, 116, such as area corresponding to the primary language in which the user is reading, and the divider 118 may be moved to the right or to the left to accommodate the text of the portion 204 or 206 in the respective areas 114, 116. Accordingly, as in the example discussed above, regardless of where the image 202 is located on the display 102, the text of the English portion 206 presented may correspond to or otherwise matchup with the text of the Spanish portion 204 presents so that one does not include content that is not in the other.

As still another alternative, two versions of the image may be presented, one in the area 114, and the other in the area 116, in alignment with one another. This option may be employed in the situation in which a caption is embedded in the image. For example, the Spanish version 110 of the content item 106 may have a first version of the image with an embedded Spanish caption, and the English version 112 may have a second version of the image with an embedded English caption. Thus, by presenting the images side-by-side, the user may compare the language embedded in the first and second images. In some examples, the user may be able to set a preference regarding how images are presented in the interface 104.

Furthermore, as indicated at 208, the user may elect to highlight, bold, underline, or otherwise visually distinguish all occurrences of one or more terms in the portions of content displayed on the interface 104. Alternatively, the electronic device 100 may perform this function by default or according to predefined user preferences. For example, by visually distinguishing a particular term such as a character name, a place name, a topic, or other identifiable term or named entity in the content item, the user has a visual anchor point when comparing portions of text with each other. Thus, as illustrated in FIG. 2 the character name "Sancho" is visually distinguished in bold typeface, as indicated at 208, which can make it easier for the user to locate particular portions of the text for comparison with one another.

As another example, the user may be able to toggle on and off a feature in which only significant words or phrases are made visible or are visually distinguished on each side of the divider 118. For example, when this feature is activated, common words may be hidden, faded or grayed-out, while other words that are believed to be of interest, such as "molinos de viento" and the English counterpart "windmills" in the example of FIG. 2, may remain visible, or may be further visually distinguished, such as by bolding, highlighting, underlining, etc. This feature may be applied to words that are less common in the language, such as may be determined based on overall term frequency in large corpus of the language. As another alternative, the words may be selected base on a complexity of the words. As still another alternative, this feature may be applied to words that are encountered for the first time in the content item, or based on other criteria.

In addition, a user may be able to set preferences so that certain terms of a content item are visually distinguished automatically upon receipt and display of a new content item. For instance, the user may set a default that particular entities, such as all character names/person names, be visually distinguished automatically when a user accesses multiple language versions of a new eBook using default settings. The user may also be able set a default to specify that, when multiple language versions of a content item are available on the electronic device 100, the multiple versions are presented automatically in the interface 104 when any one of the multiple language versions is opened or accessed. Various other use cases will be apparent to those of skill in the art in light of the disclosure herein.

Figure 3A:
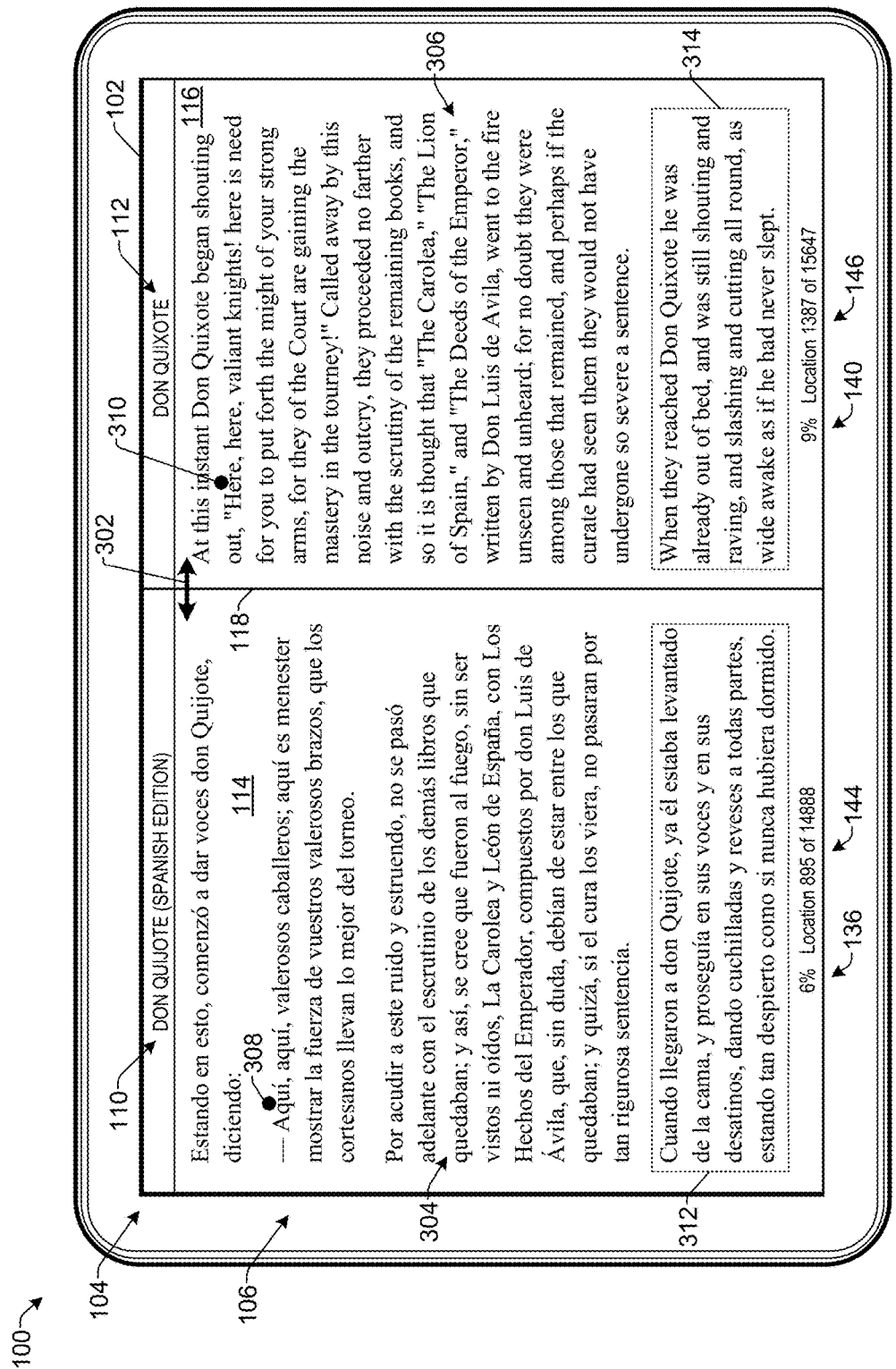
FIGS. 3A-3B illustrate example interfaces for presenting a content item in multiple languages according to some implementations.

FIG. 3 illustrates an example of the interface 104 when presenting a portion of content in a first language that takes up a greater amount of space than the corresponding portion of content in a second language according to some implementations. As mentioned above, the divider 118 between the areas 114, 116 may be moved or may be adjusted dynamically by the electronic device 100, such as indicated by the arrow 302, to enlarge one area 114, 116, while reducing the other area 114, 116, to accommodate the amount of content to be presented in either area. In the illustrated example, a Spanish-language portion of the content 304 may use a larger area of the display 102 than the corresponding English-language portion of content 306. This difference may be due to differences between languages, such as differences in the length of words used in various languages, differences in verbosity, differences in formatting customs, differences in how a concisely a written form of a language may be used to express ideas, and so forth.

Accordingly, in some examples, the location of the divider 118 may change as each discrete portion of content is presented on the display 102. For example, in the case of a touchscreen, as the user swipes from one portion of content to the next, in one of the areas 114, 116, the location of the divider may change dynamically to accommodate the next Spanish and corresponding English portions of content. Accordingly, in examples in which a particular first language is substantially more verbose than a second language, the divider 118 may typically remain off-center toward the side of the display 102 that presents the less verbose language. Alternatively, rather than moving the position of the divider 118, a font size of the language that uses more area may be reduced to accommodate the more verbose language in a same area as the less verbose a language. In some examples, the electronic device 100 may dynamically adjust the location of the divider 118 to minimize the amount of whitespace in the areas 114, 116, while still maintaining a direct correlation between the content presented in the first language and the content presented in the second language. Thus, by determining the whitespace that may be included with the text in the first language and with the text in the second language, and by adjusting the location of the divider 118 to minimize the whitespace, the interface 104 may present a maximum amount of text on either side of the divider 118. Other variations will also be apparent to those of skill in the art having the benefit of the disclosure herein.

Additionally, in some examples, the user may activate an audio playback of the content item in either of the two languages, or a third language. For example, suppose that the user activates an audio playback of the content item in the Spanish-language. One or more moving balls, or other type of location indicators 308, 310, such as moving highlighting, moving underlining, moving color-coding, or the like, may be displayed on the display 102 in a location that corresponds to a part of speech currently being spoken in the audio playback. For instance, in the illustrated example, as the audio says "Aqui, aqui," the ball 308 may appear to bounce from the illustrated location over the first "Aqui" to a location over the second "aqui." Similarly, in the area 116, the ball 310 may appear to move contemporaneously from the first "Here" to the second "here." Accordingly, the location indicators 308, 310 may follow along with audio content in the text in both of the language versions displayed on the display 102.

In some examples, the audio may be generated by the electronic device 100 using speech synthesizing techniques that automatically generate speech from provided text. Accordingly, the electronic device 100 may determine the location of the portion of text currently being synthesized, and may match this portion of text in the first language to a portion of text in the other language using mapping information, as discussed additionally below. Thus, the electronic device 100 is able to time the movement of the indicators 308, 310 with the delivery of the corresponding audio content.

In other examples, the audio may be prerecorded, such as in the case of an audio book. In this case, location and mapping information, as discussed below, may be provided or generated to enable the electronic device 100 to correlate a location in the audio recording with the locations in the displayed text of the content item 106. For example, time offsets in the audio recording may be mapped to particular portions of text in a text version of the content item. Thus, if the audio book is in Spanish, the time at which each sentence, phrase, or other part of speech, begins may be mapped to the text of the Spanish version of the content item. Thus, the indicator 308 may be progressed through the Spanish text based on the timing information, while the indicator 310 may be progressed through the English text based on position mapping between the text of the Spanish version and the text of the English version. In either case, e.g., whether the audio is synthesized or from a recording, when the end of a presented portion of content is reached, the presented page may automatically flip to the next portion of content and the audio may continue uninterrupted.

In addition, the interface 104 may present highlights, user notes, bookmarks, or other annotations 312, 314 made by a user to the content item 106. For example, suppose that the user wishes to highlight a particular part of the Spanish-language content for future reference, as indicated at 312. The interface 104 may automatically locate and highlight the English language counterpart of the highlighted Spanish content, as indicated at 314. For example, the electronic device 100 may access the mapping between particular portions of text to automatically highlight the portion 314 based on the highlighting of the portion 312 by the user, or vice versa.

Figure 3B:
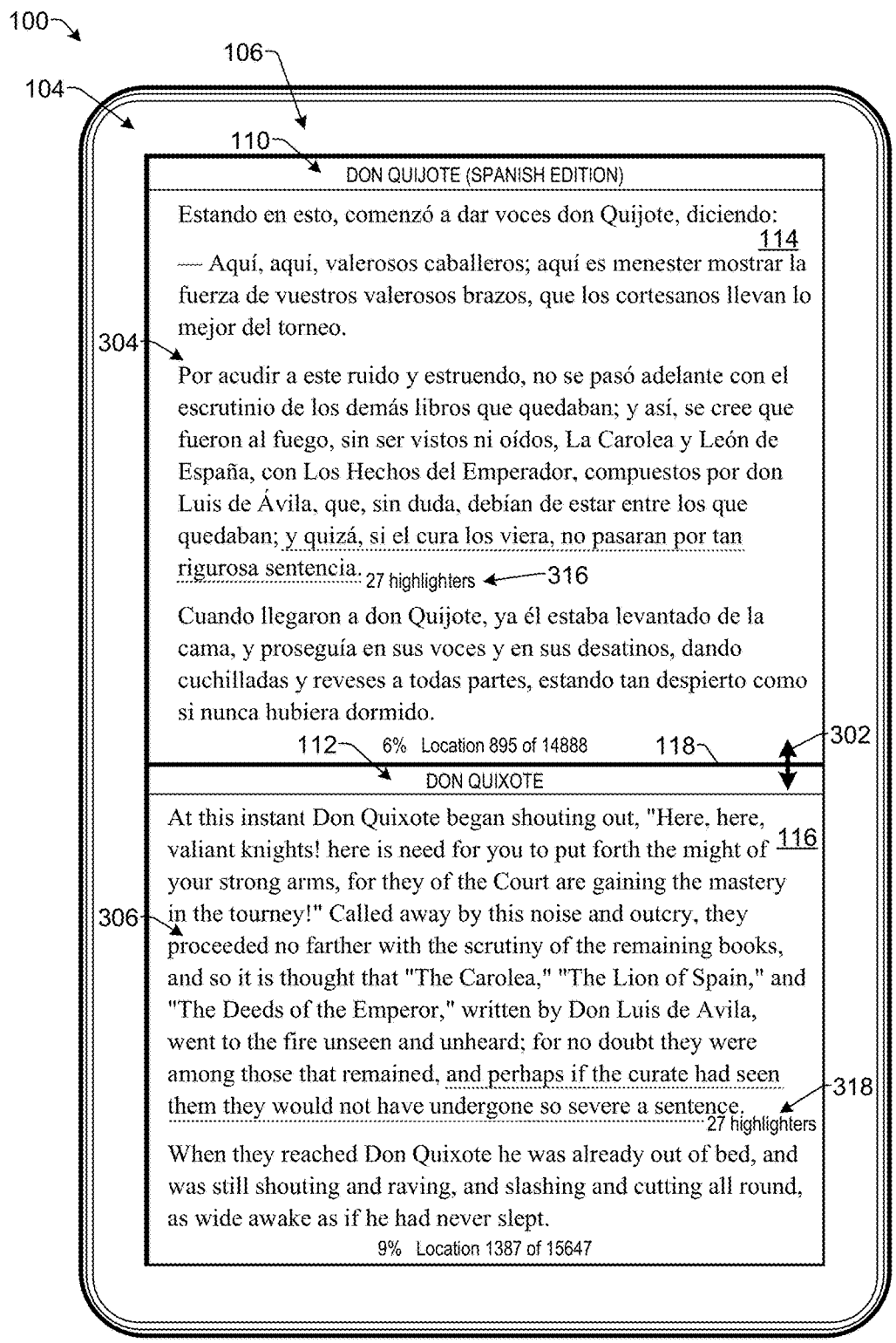

FIG. 3B illustrates an example of the interface 104, such as when the device 100 is used in a portrait orientation, rather than a landscape orientation, according to some implementations. For example, the user may prefer portrait orientation, or the user may rotate back and forth between landscape orientation and portrait orientation. In some examples, when the device is in portrait orientation, the interface 104 may remain in the side-by-side configuration, as described above. However, in the example illustrated in FIG. 3B, when the device 100 is in portrait orientation, the interface 104 may automatically reconfigure to an over-under configuration in which one of the areas 114 or 116 is displayed above the other of the areas 114 or 116. In this example, the area 114 including the Spanish language version 110 is positioned over the area 116 including the English language version 112. As mentioned above, the location of the divider 118 may dynamically adjust to accommodate corresponding portions of text 304, 306 in the two languages, while minimizing whitespace to the extent possible. The electronic device 100 may automatically reconfigure the interface 104 between the configuration of FIG. 3A and the configuration of FIG. 3B as the device 100 is rotated between landscape orientation and portrait orientation. For example, an accelerometer or other sensor in the device 100 may indicate a current orientation of the device 100 for determining which configuration of the interface 104 to present.

Furthermore, any of the examples of the interfaces 104 or other interfaces discussed herein may present an indication of portions of content that have been highlighted (i.e., "popular highlights") or otherwise annotated by a plurality of other users. For example, suppose that 27 users have highlighted a particular portion of the content item 106 in either of the Spanish language version, the English language version, or in a version in another language. These highlight annotations may be aggregated by the content provider, and an indication 316, 318 of the annotated portion may be provided in each language version 110, 112, respectively, of the content item 106 by correlating the location of the annotations using mapping information between the various different language versions of the content item. For instance, if 12 users highlighted the particular content portion in the Spanish version, 11 users highlighted the particular content portion in the English version, and 4 users highlighted the particular content portion in another language version, the annotations may be aggregated to show that a total of 27 users have annotated the particular content portion. In other examples, the English version 112 may only show annotations made to the English version 112 and the Spanish version 110 may only show annotations made to the Spanish version 110. Thus, in the example, described above, the Spanish version 110 would show 12 highlighters at 316 and the English version would show 11 highlighters at 318. Further, other types of annotations, such as user notes, user comments, and user bookmarks may be aggregated by the content provider and noted in corresponding locations of the content item 106.

In addition, depending at least in part on the languages being displayed, there may not necessarily be a one-to-one correspondence between the highlighted portions of content in the two languages. For example, a single word in a first language may be expressed as several words in a second language, or vice versa. Further, in some cases a plurality of contiguous words, phrases or sentences that are highlighted in a first language may correspond to a plurality of non-contiguous words, phrases or sentences in the second language. Accordingly, such mismatches in alignment between the two languages may be taken into consideration when highlighting corresponding portions of content in various different languages. As one example, the device (or content provider) may refer to the mapping between the content of the two content items for determining corresponding matching portions of content to highlight. For instance, if a contiguous portion of content that is highlighted in the first language is non-contiguous in the second language, the device may merely highlight the corresponding non-contiguous portions by identifying the corresponding words or phrases based on the mapping information between the content items. As an alternative, the device may highlight a contiguous portion of the second language content that includes all the non-contiguous portions. Other variations will also be apparent to those of skill in the art in light of the disclosure herein.

FIG. 4 illustrates an example of the interface 104 when presenting a first language version and a second language version, and upon hiding the second language version according to some implementations. For example, suppose that the user only infrequently refers to the English language version 112 of the content item 106. Accordingly, the user may drag or otherwise move the divider 118 partially or entirely to one side 402 of the display 102. For instance, the user may move the divider 118 partially toward the side 402, thereby reducing the area 116, and the content contained in the area 116 may be reduced in font size and/or reconfigured. In some examples, the user may set a preference such that a language in which the user is interested in reading is allotted a certain amount of display area, such as three-quarters, and the other language may be allotted a smaller amount of display area, such as one-quarter, with a reduction in font size to fit within the smaller area. Further, in some examples, the user may set a preference as to whether the primary reading area is on the left or the right, and so forth.

Furthermore, the user may choose to entirely hide one of the language versions such as by moving the divider 118 entirely to one side 402, or to an opposite side 404, of the display 102. For example, if the user desires to hide the English language version, the user may drag the divider 118 to the first side 402 (as illustrated in FIG. 4), whereas if the user desires to hide the Spanish-language version, the user may drag the divider 118 to the second side 404. In addition, in some implementations, when the user drags the divider 118 entirely to one side, 402, 404, the electronic device 100 may present a tab 406 or other indicator to provide an indication to the user that the user may still access the second language version of the content item 106. For example, the user may employ an input effecter 408, such as a finger, or other input device or technique to pull or otherwise actuate the tab 408 in the direction of arrow 410 to move the divider 118 back toward the center of the display 102. Thus, when the user drags the divider 118 back toward the center of the display 102, the amount of content of a Spanish-language content portion 412 displayed in the area 114 may be reduced to accommodate the display of a corresponding English language content portion. For example, suppose the user has progressed through a number of pages or screens of the Spanish-language version 110 since hiding the English-language version 112 of the content item 106. Accordingly, when the user moves the tab 406 and/or the divider 118 toward the center of the display 102, a portion of the English language version that corresponds to the currently displayed portion 412 of the Spanish-language version may be displayed automatically, rather than a portion of the English language version that was displayed when English-language version was hidden.

In some cases, the tab 406 may indicate the language of the version of the content item that may be accessed for display. Furthermore, in some examples multiple languages may be accessed and displayed in this manner. For example, the electronic device may also include a third-language version, such as a Dutch version, and a fourth language version, such as a French version of the content item 106, as indicated by tabs 414, 416, respectively. Accordingly, the user may drag or otherwise activate any or all of the English version tab 406, the Dutch version tab 414 and the French version tab 416. For example, depending on the size of the display 102, the user may simultaneously or contemporaneously view a portion of the content item 106 in three or more separate languages, as discussed below with respect to FIG. 5.

FIG. 5 illustrates an example of the interface 104 when presenting a content item in three or more language versions according to some implementations. In this example, suppose that the user has activated both of the tabs 406, 414 discussed above with respect to FIG. 4, such as by dragging the tabs and or corresponding divider 118 toward the left side 404 of the display 102. Accordingly, this may result in a first divider 118-1 and a second divider 118-2 being displayed. In addition to the area 114, including the Spanish version 110, and the area 116, including the English version 112, there may be a third area 502 for displaying a Dutch version 504 of the content item 106. Thus, any number of different languages may be displayed contemporaneously and compared on the device 100, such as by use of tabs 406, 414, 416 or other suitable user-interface functionalities.

Furthermore, in order to accommodate the areas 116, 502 on the display 102, the Spanish-language content portion 412 may be truncated or otherwise reduced in the amount of content displayed so that matching or corresponding portions in all three languages may be displayed contemporaneously on the display 102 in the areas 114, 116 and 502 respectively. In some examples, the relative sizes of the areas 114, 116, 502 may be adjusted by the electronic device 100 in order to accommodate an optimal size of the same content portion in each language. Thus, in the illustrated example, the relative size of the area 502 is slightly larger than the sizes of the areas 114 or 116, as a Dutch content portion 506 includes more text than the Spanish content portion 412 or an English content portion 508. Furthermore, the Dutch content portion may also indicate the percentage amount of the Dutch version that is currently consumed, as indicated at 510, and a current page number or location number 512.

Figure 6:
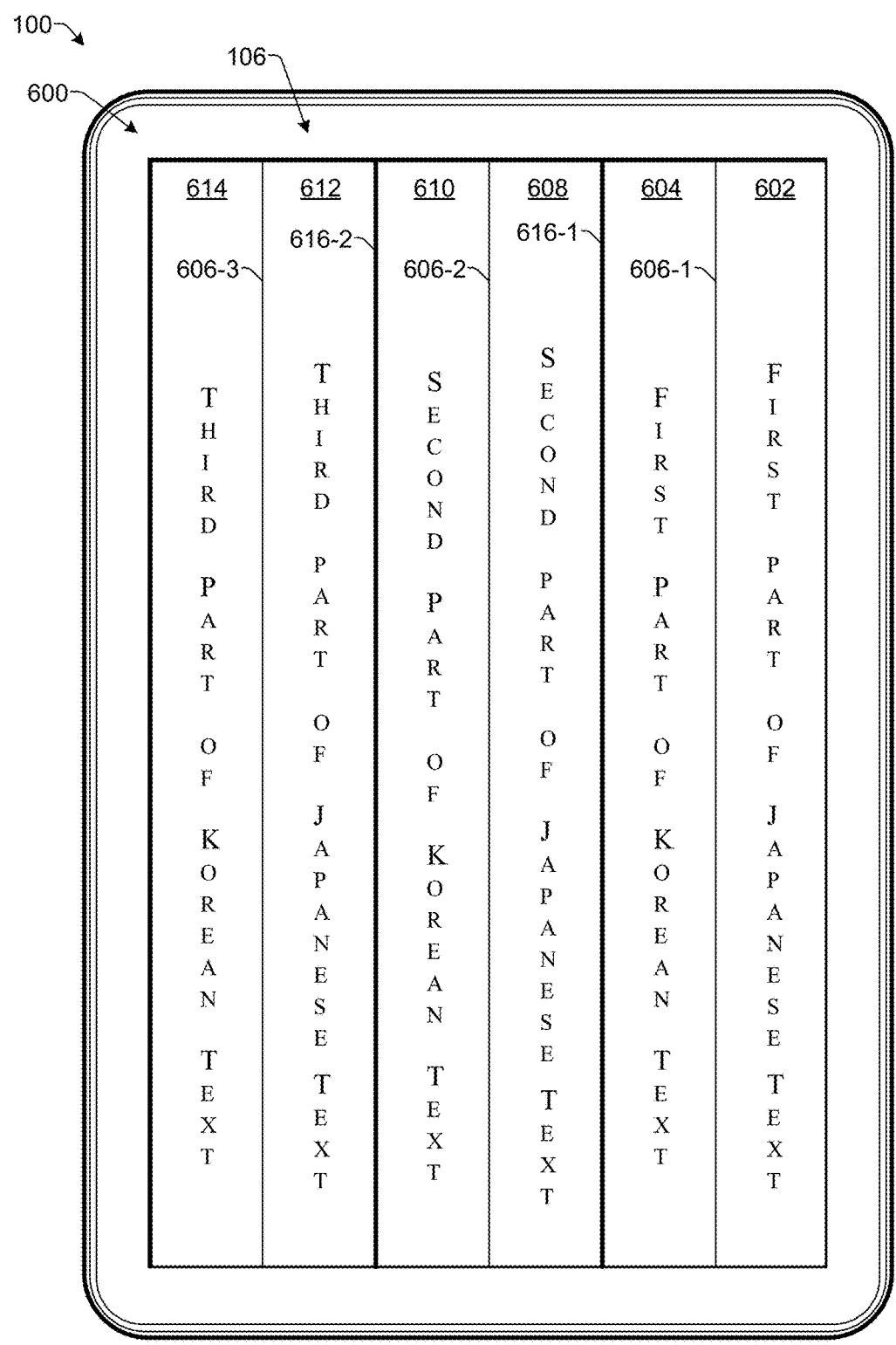
FIG. 6 illustrates an example interface that may be employed when presenting a content item in a language that is written in a vertical fashion and/or a right-to-left fashion according to some implementations.

FIG. 6 illustrates an example interface 600 that may be employed when presenting a content item 106 in a language that is written in a vertical fashion and/or a right-to-left fashion, such as some East Asian languages, according to some implementations. In this example, suppose that Japanese text and Korean text are being compared on the electronic device 100 in the interface 600. The interface 600 may include a first area 602 for containing a first part of Japanese text arranged in a vertical fashion and a second area 604 for containing a corresponding first part of Korean text also arranged in a vertical fashion. As discussed above, the first part of the Japanese text may correspond to or otherwise match in substance the first part of the Korean text. Accordingly, the first area 602 and the second area 604 may be divided by a divider 606-1. In addition, the interface 600 may include a plurality of other vertically arranged areas for presenting additional parts of text of the content item arranged in a right-to-left manner. Thus, the interface 600 may include an area 608 that contains a second part of the Japanese text, an area 610 that contains a second part of the Korean text that corresponds to the second part of the Japanese text, an area 612 that contains a third part of the Japanese text, and an area 614 that contains a third part of the Korean text that corresponds to the third part of the Japanese text. Additionally, primary dividers 616-1 and 616-2 may be located between the areas 604 and 608, and 610 and 612 respectively to provide a clear separation between the portions of content to be compared. Furthermore, the user may be provided with an option to rotate the view to horizontal, such as having the Japanese text and the Korean text displayed one above the other.

In addition, in the case of text such as Hebrew, that reads from right to left in a horizontal manner, the Hebrew text may be arranged on the left side of the interface for easy comparison with text that reads from left to right on the right side of the interface, so that the reader may read away from the divider in both versions. For example, if Hebrew is the first language on the left side of the divider 118 in the interface 104 discussed above with respect to FIGS. 1-5, and English is the second language on the right side of the divider 118, the text of each language may be justified adjacent to the divider 118. For instance, the Hebrew may be right-justified and the English may be left-justified, while the text of both versions may be ragged on the outer edges toward the sides of the display. Thus, each row of text may be aligned on either side of the divider 118 to enable easier comparison between the two language versions. Various other interfaces for comparing various different language portions of content will be apparent to those of skill in the art in light of the disclosure herein.

Example Frameworks

Figure 7:
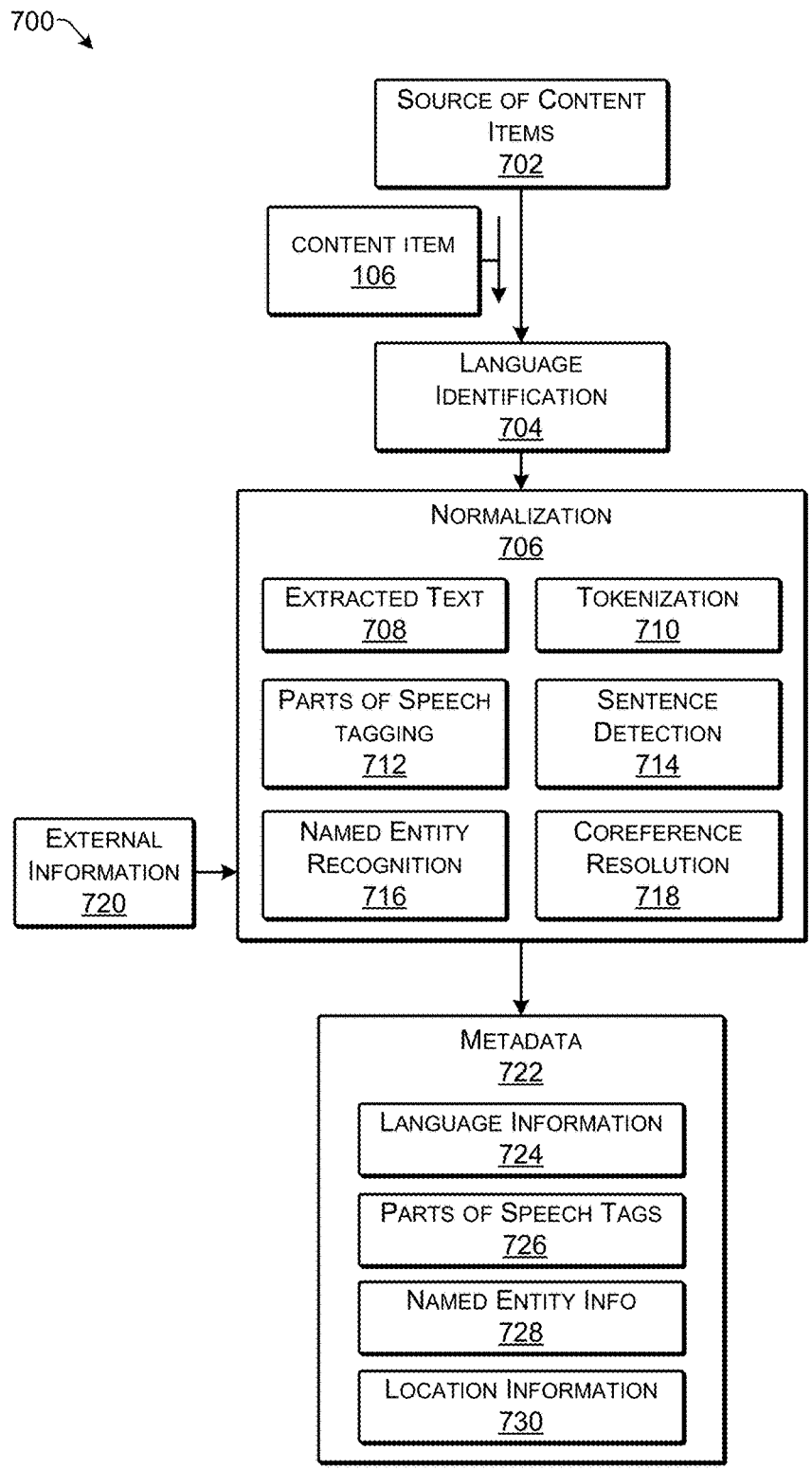
FIG. 7 illustrates an example framework for creating metadata for a content item according to some implementations.

FIG. 7 illustrates an example framework 700 that may be employed by a content provider, publisher, or other provider of content items for generating metadata, including location information, for a content item according to some implementations. In this example, the content provider may receive a content item 106 from a source 702 of content items, such as from a publisher, an author, a content item library, or other source of content items. The content item 106 may optionally undergo language identification, as indicated at 704, to identify the primary language in which the text associated with the content item 106 is written. Alternatively, the primary language of the content item 106 may already be identified by initial metadata, such as may be provided by the publisher or author of the content item.

Additionally, since content items may be stored in a variety of different formats, the text of the content item 106 may be normalized, as indicated at 706, by extracting the raw text from the content item 106 to obtain extracted text 708. The normalization 706 may include tokenization 710 of the extracted text 708 of the content item 106. As discussed additionally below with respect to FIG. 8, tokenization 710 may include parsing the text of the content item into tokens that may include individual words, punctuation marks, symbols, etc., contained in the text of the content item 106, and associating location information with each token identified in the content item 106. Thus, each word or punctuation mark in the text of the content item 106 may be assigned a unique location sequence or value, such as based on an offset of the token from the beginning of the content item and a number of characters in the token, which may be referred to as the length of the token.

The normalization 706 may include, or may be followed by, parts of speech tagging 712 and sentence detection 714. Parts of speech tagging 712 may include identification of parts of speech in the text of the content item 106, such as noun phrases, verb phrases, and various other parts of speech that may be of interest for identifying the aspects of the content item discussed above. Thus, each token may be associated with at least one part of speech. In addition, sentence detection 714 may include identifying sentences, paragraphs, sections, and chapters contained in the content item 106. In some examples, as discussed additionally below with respect to FIG. 8, the parts of speech, the identified sentences, and so forth, may have location information associated therewith that includes a start identifier, a length, and a type. For instance, a length of a sentence or a part of speech may refer to the number of tokens in the sentence or the part of speech, while the start identifier may be identified using the first token in the sentence or part of speech. Furthermore, in some examples, the parts of speech tagging may be performed incrementally one sentence at a time.

The normalization 706, including the operations described above, results in metadata 722. Additionally, normalization 706 may include, or may be followed by, named entity recognition 716 and coreference resolution 718. For example, named entity recognition 716 may include recognizing entities in the content item, such as names of people, places, organizations, topics, certain numerical expressions, quantities, and so forth. For instance, proper nouns, such as names of people, places, organizations, and the like, may be identified based on various lists of names, or other techniques for detecting and distinguishing these separate types of entities. Furthermore, in some cases, external information 720, that is external to the content item 106, may be employed to assist in named entity recognition, such as by referring to the network accessible resources and/or crowd-sourced information, or other suitable resources, such as files or databases of names, nicknames, places, organizations, etc. For example, the content provider may access network accessible resources that may include online sources of information, such as Wikipedia®, Shelfari® and IMDb®, online dictionaries, online encyclopedias, wikis, online reference sites, discussion forums, or other online resources, to determine identification of characters and other significant phrases, things, events, or places in a content item 106. In addition, coreference resolution 718 may involve identifying occurrences in the content item 106 in which multiple different names, expressions, or pronouns refer to the same person or thing in the content item 106.

In some examples, an employee of the content provider may check the named entities for accuracy and resolve any conflicts in the content item 106. As another example, external information 720 may be applied for identifying and checking the named entities. For example, the named entities for the content item 106 may be posted to a source of crowd-sourced information, which may be relied on for correcting any errors in the named entities for the content item 106. As another example, users of electronic devices 100 who receive the metadata 722 with a content item may note an error in the metadata 722 during presentation of the content item 106, and may provide the external information 720 used for named entity recognition or coreference resolution.

The resulting metadata 722 may include language information 724, parts of speech tags 726, named entity information 728, and location information 730. The language information 724 may identify a primary language of the content item 106. The parts of speech tags 726 may identify parts of speech in the content item 106 and the location in the content item 106 of each part of speech. The named entity information 728 may include proper nouns for some named entities identified in the content item 106, such as people/characters, places, organizations, as well as other nouns and noun phrases identified in the content item 106 for topics and the like. The metadata 722 may further include location information 730, which may include the location of each occurrence in the text of the content item of each identified part of speech and/or named entity, as well as a start location and end location of each token associated with each part of speech or named entity. The location information 730 may also specify a location in the text of the content item 106 of each occurrence of a named entity (i.e., either primary or representative name or an alternate name), such as characters, places, or things. For example, the location information 730 can enable the user to have all the occurrences of a particular named entity highlighted, as discussed above with respect to FIG. 2. Further, the location information 730 may be used to generate mapping information between two different language versions of a content item, as discussed below. One example of a technique for providing location information is discussed below with respect to FIG. 8.

Figure 8:
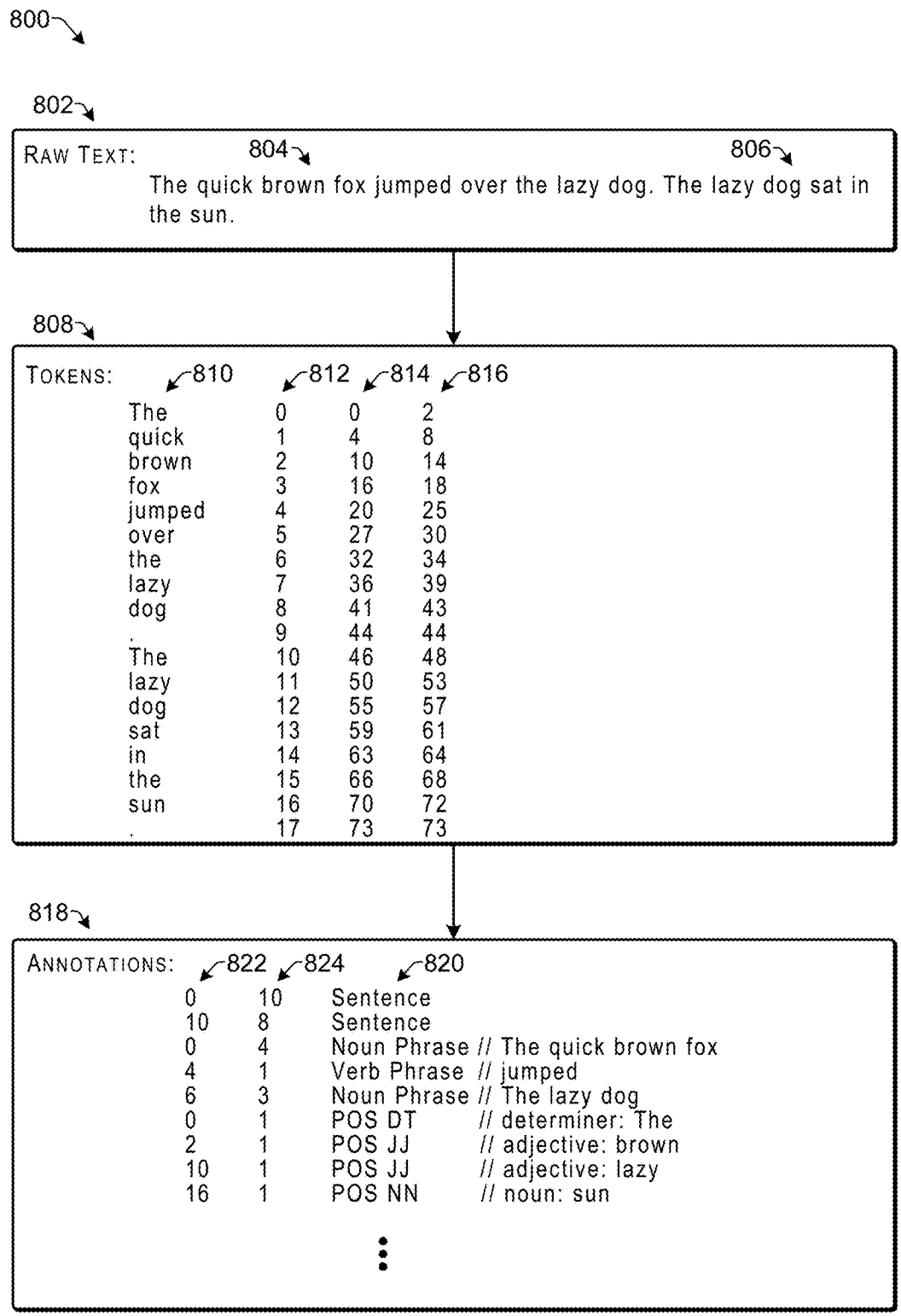
FIG. 8 illustrates an example framework for developing location information for a content item according to some implementations.

FIG. 8 illustrates an example framework 800 for determining text tokens and annotations from raw text 802 and for generating location information according to some implementations. In this example, suppose that the content item has raw text 802 that includes a first sentence 804, "The quick brown fox jumped over the lazy dog," and a second sentence 806, "The lazy dog sat in the sun." The raw text 802 may be parsed or divided into token information 808 by dividing the text into a plurality of tokens 810. For example, during parsing of the raw text 802, each word and punctuation mark in the text 802 may be identified as a separate token 810. Alternatively, in other examples, only the words of the text 802 are identified as tokens and the punctuation marks are treated as parts of adjacent words or as spaces. In some examples, the tokens 810 may correspond to renderable components that include words, phrases, and other visual or audio entities such as photographs, tunes, sounds, glyphs, equations, symbols, graphics, charts, and so forth. White space may be ignored and omitted from the location information. Formatting characters and strings used for formatting a content item 106 for presentation by a particular application, media player, or presentation module may also be ignored and omitted.

Location information may be assigned to or associated with each token 810 based on the number of characters, such as letters, numbers, spaces, or punctuation marks. The location information may include a sequentially assigned token number 812, a start location or offset 814 and an end location 816. Thus, the word "The" may be the first token in the content item and, therefore, has a token number of "0" as the first token in the content item. Further, the start location of "The" is also "0," and the end location of "The" is "2" since there are three characters in "The". Next, "quick" is the second token in the content item and so has a token number of "1." Further, the start location of "quick" is "4" (counting the space between "The" and "quick"), and the end location of "quick" is "8" since there are five characters in "quick." Thus, the entire text of the content item may be divided into tokens in this manner and each token may be associated with unique location information that identifies the location of the token within the content item.

Furthermore, annotation information 818 may be determined from the raw text 802 and the token information 808. For annotations, the location is determined based on numbering of tokens, rather than individual characters. For example, annotations 820 may refer to sentences, paragraphs, chapters, or parts of speech, such as noun phrases, verb phrases, as well as other parts of speech, such as determiners, adjectives, nouns, adverbs, pronouns, fonts, emphasis on a work, and so forth. Location information associated with each annotation 820 may indicate a start location 822 and a length 824 of each annotation 820 in terms of tokens. For example, the first sentence 804 starts at start location "0" (i.e., the first token), and is "10" tokens in length. Similarly, the second sentence 806 starts at location "10," and is "8" tokens in length. Thus, the annotation information 818 may specify particular locations of annotations within the content item based at least in part on the locations of the tokens that are included in each annotation.

Additionally, or alternatively, the location of a token (and thereby the location of an annotation or part of speech) may be identified or specified using other location identification techniques. For example, the location of each token may be identified according to the coordinates of each token on a page or within an image. Further, in some cases, a token may be an image or a portion of an image. Thus, the coordinates of the image or the portion of the image may be identified by a page number (or other location) at which the image appears and a set of x-y coordinates (i.e., in a plane of the displayed page) or other suitable coordinates. Furthermore, various other techniques for generating tokens and identifying the locations of tokens will be apparent to those of skill in the art in light of the disclosure herein, with the foregoing being merely several non-limiting examples.

Figure 9:
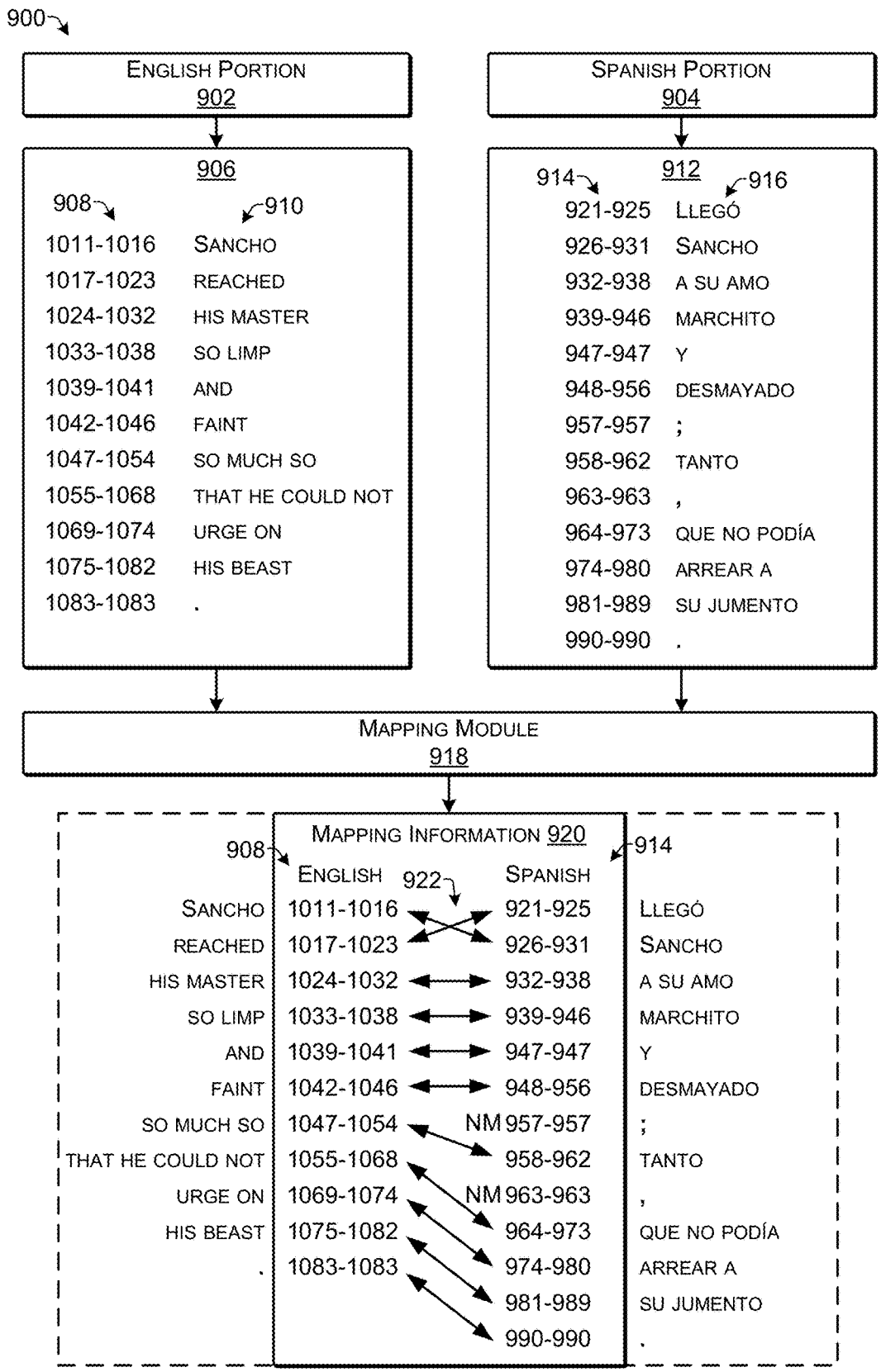
FIG. 9 illustrates an example framework for generating mapping information for multiple language versions of a content item according to some implementations.

FIG. 9 illustrates an example framework 900 for mapping location information of a first version of a content item in a first language with a second version of a content item in a second language according to some implementations. In some examples, a language may be a communication system including written, audio, or other signs or symbols that relate to a particular meaning. For instance, a first language may include words, signs or symbols for a particular meaning that are different from words, signs or symbols used by a second language for the particular meaning. Thus, in some implementations, a first language version may differ from a second language version in a manner of expression of the particular meaning, such that a person that understands the first expression in the first language may not understand the expression in the second language unless also the person also has knowledge of the second language. Examples of different languages according to some implementations herein may include English, Spanish, Hindi, Arabic, French, Mandarin, Bengali, German, Dutch, Portuguese, Japanese, Russian, Korean, Punjabi, Vietnamese, Javanese, Wu, Marathi, Telugu, Tamil, Yoe, Turkish, Italian, Pashto, Polish, Ukrainian, Swedish, Norwegian, Danish, Finnish, Hebrew, Greek, Egyptian, Thai, and Yoruba, to name a few of the many thousands of different written and spoken human languages. Further, in some examples a first dialect of a language may be a first language, while a second dialect of a language may be a second language. Similarly, a first language presented on one side of the display may be a modern version of a language and a second language presented on the other side of the display may be an older or ancient version of the same language.

In the example of FIG. 9, the first version of the content item 106 in the first language, and the second version of the content item 106 in the second language may undergo processing, such as according to the frameworks 700 and/or 800 discussed above with respect to FIGS. 7 and 8, respectively. For instance, at least the location information 730 may be developed, at least in part, for each of the first version and the second version. In some examples, location information may be developed for each token in the first version and the second version, while in other examples, the location information may be less granular, such as merely for each phrase, each sentence, or the like.

Thus, the framework 900 may include indexing the various text components or text portions of the first version in the first language, such as by associating first location information with the various text portions. The framework 900 may further include indexing the various text components or text portions of the second version in the second language, such as by associating location information with the various text portions of the second version. The framework 900 may compare one or more text portions from the first version with one or more text portions from the second version to find correlations and, for portions that correspond to one another, may map the associated locations to one another.

In the illustrated example, suppose that the first language version is an English language version and a second language version is a Spanish language version. Accordingly, during mapping, the framework 900 may receive an English portion 902 and a Spanish portion 904, which may map to one another. In this example, the English portion may read "Sancho reached his master so limp and faint so much so that he could not urge his beast on," while the Spanish portion may read "Llegó Sancho a su amo marchito y desmayado; tanto, que no podia arrear a su jumento." As indicated at 906, location information 908 may be associated with the English language text 910, and as indicated at 912, location information 914 may be associated with the Spanish-language text 916. In this example, the location information may correspond, at least in part, to the techniques discussed in the example above with respect to FIG. 8. For example, as indicated at 906 and 912, the respective portions of text may be broken down into parts of speech, such as noun phrases, verb phrases, and so forth, and position or location information may be associated with each part of speech. However, implementations herein are not limited to any particular type of location information or any particular granularity of the location information.

A mapping module 918 may receive the English text 910, and corresponding location information 908, along with the Spanish text 916 and the corresponding location information 914. The mapping module 918 may carry out translation and comparison of the English portion of text 910 with the Spanish portion of text 916 to map location information 908 of the English text 910 with corresponding location information 914 of the Spanish text 916. The mapping module 918 may compare a machine translation of each part of speech in the first language with each part of speech in the second language to identify relative matches between the English portion 902 and the Spanish portion 904. For example, the word "Llego" from the Spanish text 916 may be translated in to English as "arrived," "came," "got" or "reached." Similarly, "reached" from the English text 910 may be translated into Spanish as "alcanzado," "llego," or "llegado." Accordingly, the mapping module may map "reached" from the English text 910 to "Llego" from the Spanish text 916 with a high level of confidence. In some examples, the mapping module may perform machine translation of both input parts of speech when carrying out a comparison, while in other examples, the mapping module 918 may only perform machine translation of one of the inputs, such as translating English to Spanish or Spanish to English. Additionally, in some examples, rather than comparing individual words, the device may compare phrases of two or more words. For example, common phrases may be matched up in the two different language versions by comparing multiple word phrases with translations of multiple word phrases. As mentioned above, often a single word in a first language may correspond to multiple words in a second language or vice versa. Accordingly, a word-to-word correspondence may not always be practical. Thus, comparing phrases with phrases may result in a more accurate matching of corresponding content of two different languages. Furthermore, the mapping module may include one or more statistical models, such as one or more trained machine learning models, which may be used to establish a confidence level when the matching portions of one language with portions of another language.

In addition, punctuation marks, such as periods, question marks, exclamation points, and the like, as well as other well-defined locations, such as chapter beginnings, chapter endings, paragraph beginnings and endings, locations of figures and tables, and the like, may also be used as clues for determining the mapping between two portions of two different language versions of the content item. For example, there may be a mapping made from the period at 1083 in the English portion to the period at 990 in the Spanish portion with a large level of confidence.

The mapping module 918 may generate a version-to-version location map as mapping information 920 that may include the location information 908 for the English portion in one column and the location information 914 for the Spanish portion in another column. Mappings between the location information 908, 914 may be established by any suitable means such as by pointers 922 in which the location information for a particular part of speech may point to the corresponding location information in the other language and vice versa. Additionally, in some cases, tokens such as the "semicolon" and the "comma" in the Spanish text may not have a matching counterpart in the English text. Accordingly, these may be marked with an indicator such as "NM" to indicate a "Null," i.e., that there is no match for the tokens at these locations (i.e., locations 947 and 963 in the Spanish text).

In some implementations, additional mapping information might be included. In particular, each pointer 922 described above may be accompanied by a confidence factor ("CF"), indicating the confidence with which the mapping was made. This CF indicator might be used for various purposes. For example, if a match or translation has a relatively low CF, human-based analysis might be performed to confirm the match. When the mapping module has determined the mapping information, the mapping information may be added to the metadata for the content item 106.

For purposes of illustration, FIG. 9 also shows the original words to the left and right of the mapping information 920. The words may or may not be included in the actual mapping data structure. Furthermore, the mapping information 920 may be arranged any suitable type of data structure and is not limited to the example described herein.

In addition, in the case that one of the language versions of the content item 106 is an audio recording, such as an audio book, the audio recording may be tokenized as a series of time offsets from a beginning of the recording. Accordingly, the time offsets for a particular portion of the audio recording may be mapped to a particular part of text of the same language version of the content item. For example, if the audio recording is in English, the English audio recording may be mapped to the English text of the content item 106 based on the time offsets of the audio recording. Additionally, based on the mapping between the English text of the content item and the Spanish text of the content item, the English audio recording may also be mapped to the Spanish version of the content item. In some examples, the time offsets in the audio recording may be determined on a granularity of individual sentences, while in other examples, the granularity may be greater, such as having time offsets for each phrase, or each word. Speech recognition techniques may be applied, similar to the machine translation technique discussed above, for correlating a particular time offset for a spoken word with a particular word in the text according to a confidence level.

In some examples, rather than being executed by the content provider, the framework 900 may be executed by the electronic device 100, such as in advance, or on the fly. Thus, in some examples, the electronic device 100 may include the mapping module, and may determine the mapping information 920 in advance, such as upon receipt of a second language version of a content item 106.

As another alternative, the electronic device may perform the mapping on the fly, by comparing a machine translation of a currently presented portion of content with content of the other language version of the content item. Thus, in this alternative, when the mapping is not performed in advance, suppose that the user advances to a portion of Spanish content. The electronic device 100 may translate that portion of Spanish content to English using machine translation techniques, and may compare the machine translation with approximate locations in the English version of the content item to locate the matching English portion that corresponds in substance to currently presented portion of Spanish content. For example, the comparison may be carried out in a manner similar to that described above. The electronic device 100 may then present the located portion in the interface 104.

The implementations herein typically employ previously translated versions of a content item, which greatly increases the accuracy of mapping one version in a first language to another version in a second language. Because in these implementations the translation was previously performed, such as by human, the multiple language versions presented in the interface 104 may be extremely accurate, which would not necessarily be the case if a machine translation were presented in the user interface 104. Of course, in other implementations, the electronic device 100 may perform on-the-fly machine translation and present the translation as the second language version in the interface 104. While current technology in machine translation is not sufficiently accurate to produce a desired level accuracy, improvements in the technology may result in machine translation techniques that are sufficiently accurate for use in the implementations described herein, and the mapping techniques herein may then not be used. Furthermore, while several example techniques have been described herein, numerous other possible techniques will be apparent to those of skill in the art having the benefit of the disclosure herein.

Example Architecture

Figure 10:
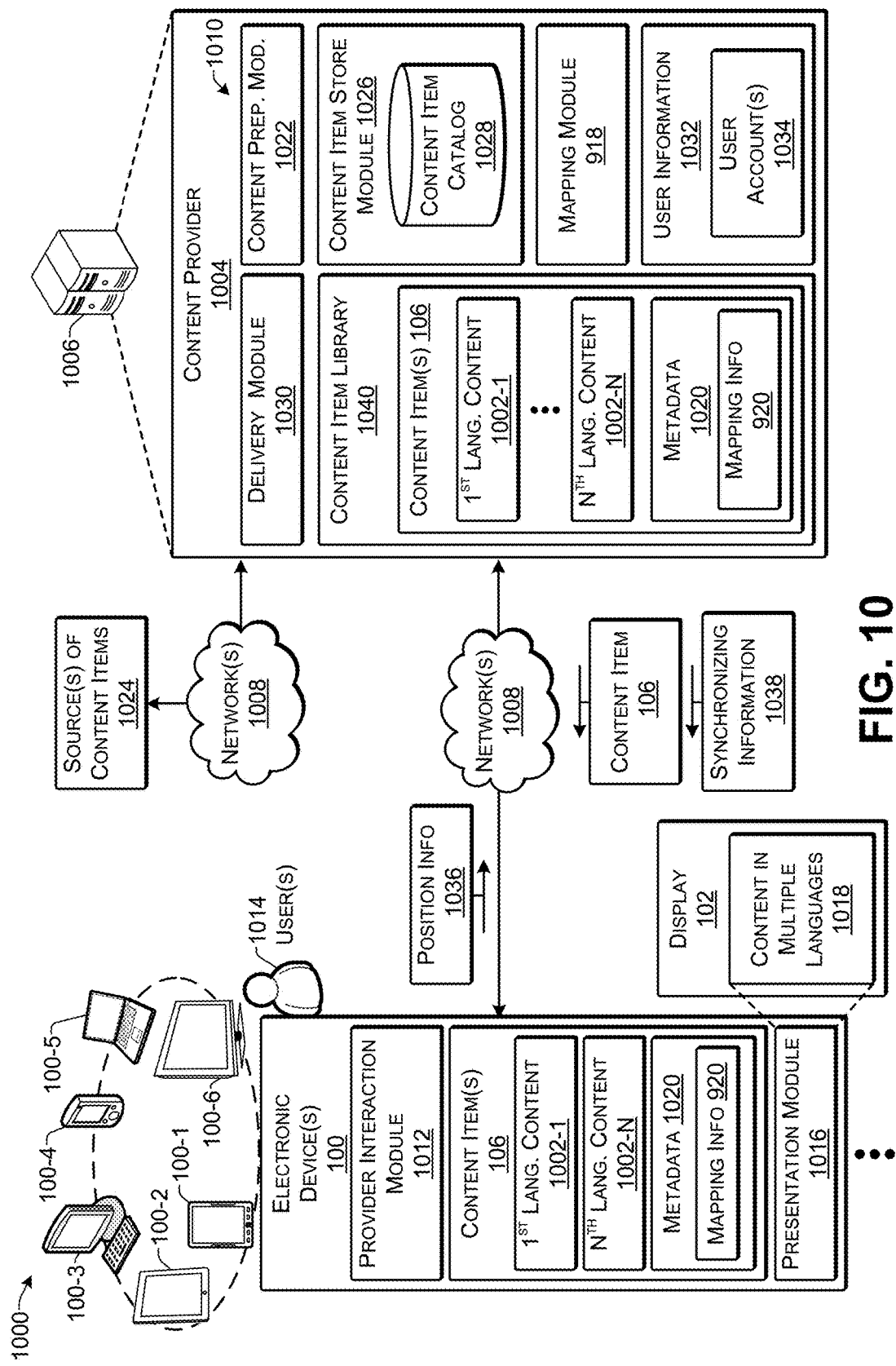
FIG. 10 illustrates an example system architecture for facilitating presentation of multiple language versions of a content item according to some implementations.

FIG. 10 illustrates an example architecture of a system 1000 to provide content items and to enable presentation of multiple language versions of a content item according to some implementations. In some examples, an instance of a content item 106 including content 1002, such as first language content 1002-1, . . . , Nth language content 1002-N may be presented by one or more electronic devices 100 capable of displaying, rendering or otherwise presenting the content item 106, such as on the associated display 102. Some examples of the electronic device(s) 100 may include digital media devices and eBook readers 100-1; tablet computing devices 100-2; desktop, terminal and workstation computing devices 100-3; smart phones and mobile devices 100-4; laptop and netbook computing devices 100-5; televisions, gaming systems, and home and automotive electronic devices 100-6; and any other device capable of accessing and rendering or playing content items, online content, mobile content, textual content, multimedia content, or the like.

In the illustrated example, the electronic device 100 is able to communicate with a content provider 1004. For instance, the electronic device 100 may communicate with one or more computing devices 1006 of the content provider 1004, to access or receive at least one content item 106 over one or more networks 1008. For example, the network(s) 1008 may include a local area network (LAN), a wide area network (WAN), such as the Internet, or any combination thereof, and may include both wired and wireless communication technologies using any suitable protocols and communication techniques. The computing device 1006 of the content provider and the electronic device 100 may communicate and interact with one another using any combination of suitable communication and networking protocols, such as Internet protocol (IP), transmission control protocol (TCP), hypertext transfer protocol (HTTP), and so forth. In some cases, the electronic device 100 may download one or more content items 106, while in other cases the content items 106 may be streamed to the electronic device 100.

The content provider 1004 may maintain an online location or site 1010, such as a merchant website, an e-commerce site, or other functionality that offers one or more content items 106 to the public. For example, the content provider site 1010 may be hosted on one or more of the computing devices 1006. In some cases, the host computing devices 1006 may be one or more web servers located at a data center, server farm, or other single physical location. In other cases, the content provider site 1010 or portions thereof may be located in diverse locations that are physically remote from one another. Further, in some implementations, the content provider site 1010 may be a group of websites, data stores, services, and the like, hosted on a plurality of different host computing devices 1006 in a plurality of diverse locations, or hosted by one or more host computing devices 1006 at a single location.

In some implementations, the content provider site 1010 may offer content items 106 to the public through an online presence accessible by a web browser or other application. In some examples, the content provider site 1010 alternatively, or additionally, may provide content items 106 through an online or mobile application executing on the electronic device 100. For example, an application on the electronic device 100 may connect to or obtain content from the content provider site 1010 to enable the purchase or management of one or more content items 106, and the like.

Thus, the content provider site 1010 may enable the electronic device 100 to access content items 106 through an online or mobile application executing on a mobile device as the electronic device 100, such as an eBook reader, smart phone, tablet computing device, augmented reality device, or the like. Accordingly, the content provider site 1010 is not limited to a website accessed by a browser, but may encompass other technologies for marketing and providing content items 106, such as through in-application shopping, and the like.

The electronic device 100 may include a provider interaction module 1012, which in some instances may be an application, such as a web browser, mobile application, or other module or computer program configured to receive web content, webviews, online content, or the like, for accessing and interacting with one or more modules of the content provider 1004. For example, the provider interaction module 1012 may enable a user 1014 to shop for content items at the content provider site 1010 and access or receive content items 106 from the content provider site 1010, such as by downloading through the network 1008. Further, in some implementations, the provider interaction module 1012 may enable the user 1014 to organize or manage the content items 106 on the electronic device 100, while in other implementations a separate management module (not shown) may provide this functionality. Additionally, while FIG. 10 illustrates an example user 1014 and electronic device 100, the described techniques can of course be used with any number of users 1014 and electronic devices 100. In addition, a single user 1014 may use a plurality of electronic devices 100.

The electronic device 100 may include a content item presentation module 1016 and at least one content item 106. In some implementations, the presentation module 1016 and the provider interaction module 1012 may be separate modules or applications. In other implementations, the presentation module 1016 and the provider interaction module 1012 may both be part of the same application or computer program for accessing and presenting content on the electronic device 100. In yet other implementations, the presentation module 1016 and the provider interaction module 1012 may represent different functionalities of the same module.

As one example, the presentation module 1016 may present content 1018 in multiple languages on the display 102, such in first language content 1002-1 and second or Nth language content 1002-N. In some examples, the display 102 may be part of the electronic device 100, and/or unitary with the electronic device 100. In other examples, the display 102 may be separate from the electronic device 100 and connected to or coupled with the electronic device 100. In any case, the presentation module 1016 may render content 1018 in multiple languages on the display 102 for viewing by the user 1014. The presentation module 1016 may further display content 1018 having one or more portions, such as one or more character names, places, things, etc., that are visually distinguished from other portions. Each language version content 1002-1, . . . , 1002-N of the content item 106 may be contained in at least one content file. Thus, the presentation module 1016 may control which portions of the content 1002 are presented as part of the content 1018, when the content 1018 in multiple languages is presented on the display 102. The presentation module 1016 may also control the visual distinguishing of one or more named entities, the automatic placement of the divider 118, moving highlighting, bouncing balls, and the like.

Further, in some examples, the content item 106 may include metadata 1020 that is associated with the particular instance of the content item 106, such as in one or more metadata files. In some examples, the metadata 1020 may correspond to the metadata 722 discussed above with respect to FIGS. 7-9, and may include the mapping information 920. In some examples, the metadata 1020 may be contained in a separate file from the content 1002-1, 1002-2, . . . , while in other examples, the metadata 1020 may be combined with the content 1002-1, 1002-2, . . . , into a single file.

The presentation module 1016 may present one or more interfaces for displaying multiple language versions of a content item. Thus, the presentation module 1016 may generate and display the interfaces 104 and/or 600. For instance, in some cases, the interfaces 104, 600 and/or graphic effects, such as colored text, colored or patterned backgrounds, highlighting, bolding, underlining, italicizing, outlining or other graphic effects, may be generated using any of HTML (hypertext markup language), JavaScript®, CSS (Cascading Style Sheets), widgets, or any combination thereof, or any other suitable technology or graphics rendering software.

In some implementations, each content item 106 may include content 1002, such as text, images, audio, video, or the like, and may further include the metadata 1020 that is associated with the content item content 1002. For example, the content provider 1004, the author, the publisher, etc., may provide or may generate at least a portion of the metadata 1020 for a corresponding content item 106, such as discussed above with respect to FIGS. 7-9. In some examples, the content provider 1004 may generate the metadata 1020 for a respective content item 106 to provide information related to the content 1002 of the content item 106. For instance, the content provider 1004 may include a content preparation module 1022 that may receive a raw content item from one or more sources 1024 of content items. The sources 1024 of content items may be publishers, authors, movie distributors, studios, music companies, artists, and so forth.

In the case of textual content items 106, the content preparation module 1022 may parse and process the text of the raw content item to produce the content 1002 that is compatible with various display formats, device platforms, and so forth. The content preparation module 1022 may further parse and analyze a raw content item to produce at least a portion of the metadata 1020 that corresponds to the content item 106. For example, as discussed above with respect to FIGS. 7-9, the metadata 1020 may include the mapping information 920 to map particular parts of content in a first language to particular corresponding or matching parts of content in a second language. Thus, during presentation of the content item 106, the presentation module 1016 may use at least the mapping information 920, at least in part, to determine which portions of the content item to present. Further, in some examples (not shown in FIG. 10), the metadata 1020 may include a variety of additional information, such as language information 724 identifying the primary language in which the content is written; parts of speech tags 726 to identify the parts of speech contained in the content and the location of each part of speech contained in the content, location of each word, location of individual sentences, paragraphs, chapters, and so forth; named entity information, such as the names and locations of terms recognized in the content item; and location information 730 that identifies location of portions of content within the content item. In some cases, the location information included with the metadata 1020 or the content 1002 may be used, at least in part, to enable identification of portions of the content 1002, such as a term selected by the user to be visually distinguished when displayed with the text.

The content provider site 1010 may include a content item store module 1026 that may provide or may access a content item catalog 1028. For example, the content item store module 1026 may present the content item catalog 1028 to the provider interaction module 1012 of an electronic device 100 that accesses the content provider site 1010 to shop for a content item 106. The content item catalog 1028 may include searchable and/or browsable listings and descriptions of content items 106 available from the content provider site 1010. The content item store module 1026 may communicate with the provider interaction module 1012 on the electronic device 100 to enable the user 1014 to locate and acquire a content item 106 from the content provider site 1010.

For example, the content item catalog 1028 may include one or more content items that have multiple versions in multiple different languages. For example, a user may acquire a first language version of a content item 106 in a first language, and may also acquire a second language version of the content item 106 in a second language, different from the first. In some examples, the metadata 1020, including mapping information 920, may be provided with the first language version acquired by the user. In other examples, at least the mapping information 920 may not be provided until the corresponding second language version is acquired by the user. In some examples, an update to the presentation module 1016 may also be provided with the mapping information and/or the second language version to enable the presentation module 1016 on the electronic device 100 to display the interfaces 104, 600 discussed above for presenting multiple versions of a content item in different languages on the electronic device 100.

In some implementations, after the user 1014 has purchased or otherwise acquired a first language version 1002-1 of a content item 106, the content provider 1004 may offer a second or subsequent language versions of the content item to the user 1014 at a discount from the regular price. As another example, the content provider may bundle a plurality of language versions 1002-1, . . . , 1002-N together to be offered at a bundled price that is less than what the user would pay if purchasing each version individually. As a further incentive, that the content provider may provide screenshots or demos of the user interface 104, and offer the feature to the user if the user purchases the bundle. For instance, the bundle may include an update to the presentation module 1016 to enable the display of multiple versions of the content item incorporating the features and functionality discussed above with respect to FIGS. 1-6. As another example, a machine translation may be offered at a first price, and a professional human translation may be offered at a higher price. As still another example, the user may be offered a free sample of a second language version, such as 5% of the content of the second language version, which the user may try out. After the user has exhausted the 5% free sample, the content provider may offer the user the opportunity to acquire the entire content of the second language version.

The content provider site 1010 may further include a delivery module 1030 that may deliver (or make available for delivery) a content item 106 to the electronic device 100 and/or the user 1014. For example, in some instances, the delivery module 1030 may facilitate the download of a content item 106 to the electronic device 100 over the network(s) 1008, such as download of a first language version 1002-1 and a second language version 1002-2, and corresponding mapping information 920 that maps portions of content of the two versions to one another. In other instances, the delivery module 1030 may provide for delivery of a hard copy of a content item 106 to the user 1014, such as by delivery of a storage medium that maintains a copy of the content item, depending on the nature of the content item and the electronic device 100. The delivery module 1030 may also expose programmatic interfaces or APIs (application programming interfaces) that electronic devices 100 can use to obtain digital content items and related services.

Furthermore, in some implementations, the delivery module 1030 may refer to user information 1032 to determine one or more content items 106 to download to the electronic device 100. For example, the user information 1032 may include account information 1034, such as user contact information, a purchase history, a user content item library, information on various devices 100 associated with a particular user account, or other records of content items purchased by the user 1014, as well as other transactions of the content provider 1004 with the user 1014. Accordingly, in some cases, the delivery module 1030 may assist in synchronizing the content of multiple devices 100 of a user or a user account, such as for delivering and synchronizing multiple instances of a content item 106 on multiple devices 100 associated with a single account.

Further, the user information 1032 may include user account information for a plurality of users 1014 of the content provider site 1010. For example, the user information 1032 may include a user account 1034 for each user for identifying and interacting with the user, such as name, email address, mailing address, telephone number, user identification (ID) number, user purchase history (e.g., content items 106 acquired by the user), usage and interaction information, and so forth.

In some examples, the electronic device 100 may send position information 1036 to the content provider 1004 for inclusion with other information in the user's account 1034. For instance, the position information 1036 may include information indicating which multiple language versions of a content item a user opened together and a current position or point of progress in each for each content item 106 accessed by the user 1014. The position information 1036 associated with a particular user account may be used to synchronize the content item 106 with other instances of a particular content item on other devices 100 associated with the particular user's account. Accordingly, the delivery module 1030 of the content provider may send synchronizing information 1038 to the other device(s) of the particular user so that when the user accesses the content item 106 having multiple language versions on the other device, the other device may present the multiple language versions in the same condition and position as when the user last accessed them on the first user device. The synchronizing information 1038 may be received by the other electronic device(s) 100 of the particular user, and may be employed the next time that the user accesses the particular content item 106 on the other electronic device(s) 100. When the user opens the same content item on the second electronic device 100, the second electronic device 100 may use the synchronizing information 1038 to automatically open both language versions of the content item and navigate within the two versions of the content item to the last or furthest location that was previously accessed from the first electronic device. The synchronizing information 1038 may be further used to add any highlighting, notes or other annotations made to the content item on the first device to the multiple language versions opened on the second device.

The content provider site 1010 may also include or may access a content item library 1040. For example, the content item library 1040 may include a plurality of content items 106 that the content provider 1004 has available for access by electronic devices 100, such as by purchase through the content items catalog 1028. Each content item 106 in the content item library 1040 may include both content 1002 and metadata 1020 corresponding to the content. In some examples, the content item library 1040 may contain hundreds of thousands of unique content items 106, including a variety of eBooks, such as fiction, non-fiction, etc., and various other types of content items, examples of which have been enumerated above.

Further, in some implementations, a content item 106 to be delivered may be provided to a third party, such as a wireless provider that sends the content item 106 to the electronic device 100. Accordingly, an intermediary, such as a wireless network provider (not shown), or the like, may make the content item 106 available for delivery to a particular electronic device 100, or may otherwise provide the content item to the particular electronic device 100, and may further provide for synchronization of metadata, such as the selection information 1036, to other devices 100 of a user. For purposes of this disclosure, "providing" or "making available" by the content provider may include any intermediaries that perform delivery of the content items and/or selection information related to the content items, such as metadata 1020.

The content provider site 1010 may also include various other site components as is known, depending on the design and intended use of the content provider site 1010. Such other site components may include one or more pages of content, such as webpages, webviews, or other online content, that may be presented to the user 1014 through the provider interaction module 1012, such as during shopping for content items 106 from the content provider site 1010.

The content provider site 1010 may further include a mapping module 918 that may be employed in some implementations for generating and managing mapping information 920 as discussed above with respect to FIG. 9. In some examples, when the user 1014 of the electronic device 100 accesses, purchases or otherwise acquires a particular content item 106, such as through interaction with the content provider 1004, the content provider 1004 may make the particular content item 106, including the corresponding content 1002 and metadata 1020, available for delivery to the electronic device 100. In some cases, the mapping information 920 is included in the same file as the content 1002, while in other cases, the mapping information 920 may be maintained in metadata 1020 corresponding to the particular content item 106, which may be a separate file from the content 1002.

The mapping module 918 may operate on the content items 106 in the content item library 1040 to produce the mapping information 920. For example, the mapping module 918 may select a particular content item 106 from the content item library 1040 for generating mapping information 920 for the particular content item 106. The mapping information 920 generated for each content item may be stored in the metadata 1020 for the particular content item 106, or other suitable location. When the user 1014 acquires a particular content item 106, such as through interaction with the content item store module 1026, the delivery module 1030 may deliver the particular content item 106 to the electronic device 100, and may also deliver the corresponding mapping information 920 for the particular content item, such as with the metadata 1020. For example, the particular content item 106 including the corresponding mapping information 920 and metadata 1020 may be downloaded contemporaneously from the content item provider site 1010, e.g., as a package or as a sequential download.

Furthermore, while the examples herein show the mapping module 918 being located on the content provider computing device(s) 1006, in other examples, some or all of the mapping module 918 may be located on the electronic device 100, and thus, the electronic device 100 may generate some or all of the mapping information 920. Numerous other variations will be apparent to those of skill in the art in light of the disclosure herein.

Example Electronic Device

Figure 11:
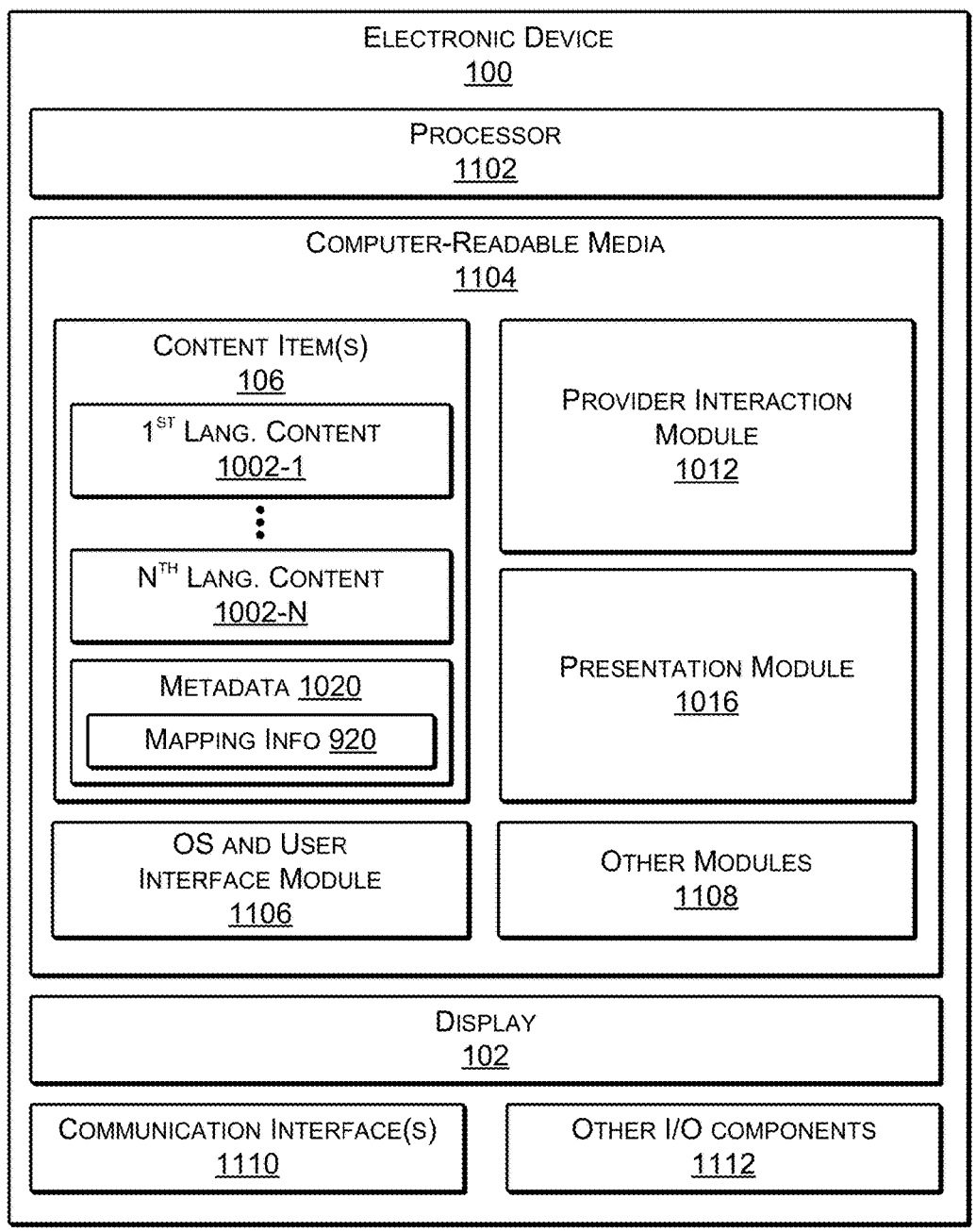
FIG. 11 illustrates select components of an example electronic device according to some implementations.

FIG. 11 illustrates select example components of the electronic device 100 that may be used to implement the functionality described above according to some implementations. In a very basic configuration, the electronic device 100 includes, or accesses, components such as at least one control logic circuit, central processing unit, or processor 1102 and one or more computer-readable media 1104. Each processor 1102 may itself comprise one or more processors or processing cores. Depending on the configuration of the electronic device 100, the computer-readable media 1104 may be an example of tangible non-transitory computer storage media and may include volatile and nonvolatile memory and/or removable and non-removable media implemented in any type of technology for storage of information such as computer-readable instructions, data structures, program modules or other data. Such computer-readable media may include, but is not limited to, RAM, ROM, EEPROM, flash memory or other computer-readable media technology, CD-ROM, digital versatile disks (DVD) or other optical storage, magnetic cassettes, magnetic tape, solid state storage, magnetic disk storage, RAID storage systems, storage arrays, network attached storage, storage area networks, cloud storage, or any other medium that can be used to store information and which can be accessed by the processor 1102 directly or through another computing device. Accordingly, the computer-readable media 1104 may be computer-readable media able to store and maintain instructions, modules or components executable by the processor 1102.

The computer-readable media 1104 may be used to store any number of functional components that are executable by the processor 1102. In some implementations, these functional components comprise instructions or programs that are executable by the processor 1102 and that, when executed, implement operational logic for performing the actions attributed above to the electronic device 100. Functional components of the electronic device 100 stored in the computer-readable media 1104 may include the presentation module 1016, as described above, which may be executed by the processor 1102 for presenting one or more content items 106 in multiple language versions, such as in the user interfaces 104, 600. Additional functional components stored in the computer-readable media 1104 may include the provider interaction module 1012, executable by the processor 1102 for obtaining the content item(s) 106, including content 1002 as well as any corresponding metadata 1020 including mapping information 920. Other functional components may include an operating system and user interface module 1106 for controlling and managing various functions of the electronic device 100. Depending on the type of the electronic device 100, the computer-readable media 1104 may also optionally include other functional components, such as other modules 1108, which may include applications, programs, drivers and so forth.

The computer-readable media 1104 may also store data, data structures, and the like that are used by the functional components. For example, data stored by the computer-readable media 1104 may include the one or more content items 106. Each content item 106 may include content 1002 and metadata 1020. The content 1002 may include a first language content 1002-1, . . . , Nth language content 1002-N. The metadata 1020 may include mapping information 920 for mapping portions of the multiple language content to one another. The electronic device 100 may also include other data, which may include, for example, data used by the provider interaction module 1012, the operating system and user interface module 1106, and the other modules 1108. Further, the electronic device 100 may include many other logical, programmatic and physical components, of which those described are merely examples that are related to the discussion herein.

FIG. 11 further illustrates the display 102, which may be passive, emissive or any other form of display. In one implementation, the display uses electronic paper (ePaper) display technology, which is bi-stable, meaning that it is capable of holding text or other rendered images even when very little or no power is supplied to the display. Some examples of suitable ePaper displays that may be used with the implementations described herein include bi-stable LCDs, MEMS, cholesteric, pigmented electrophoretic, and others. In other implementations, or for other types of devices, the display 102 may be an active display such as a liquid crystal display, plasma display, light emitting diode display, organic light emitting diode display, and so forth. These displays may comprise drive electronics, such as a display drive matrix configured to affect individual pixels within the display 102. Additionally, in some implementations, the display 102 may be a 3D display capable of providing a 3D image. For example, the display 102 may produce a 3D image by providing alternating left-eye and right-eye images with or without the use of shuttering or filtering eyeglasses. Accordingly, in some implementations, the content items and user interface components herein may be rendered in 3D.

One or more communication interfaces 1110 may support both wired and wireless connection to various networks, such as cellular networks, radio, WiFi networks, short-range or near-field networks (e.g., Bluetooth®), infrared signals, local area networks, wide area networks, the Internet, and so forth. For example, the communication interface 1110 may allow a user of the electronic device 100 to access the World Wide Web, download content items from the content provider site 1010, access online content, such as from a website or other network location, and the like. The communication interface 1110 may further allow a user to access storage on another device, such as a user's computing device, a network attached storage device, cloud storage, or the like.

The electronic device 100 may further be equipped with various other input/output (I/O) components 1112. Such I/O components may include a touchscreen and various user controls (e.g., buttons, a joystick, a keyboard, a mouse, etc.), speakers, a microphone, a camera, connection ports, and so forth. For example, the operating system 1106 of the electronic device 100 may include suitable drivers configured to accept input from a keypad, keyboard, or other user controls and devices included as the I/O components 1112. For instance, the user controls may include page turning buttons, navigational keys, a power on/off button, selection keys, and so on. Additionally, the electronic device 100 may include various other components that are not shown, examples of which include removable storage, a power source, such as a battery and power control unit, a global positioning system (GPS) device, a PC Card component, and so forth.

Example Computing Device(s)

Figure 12:
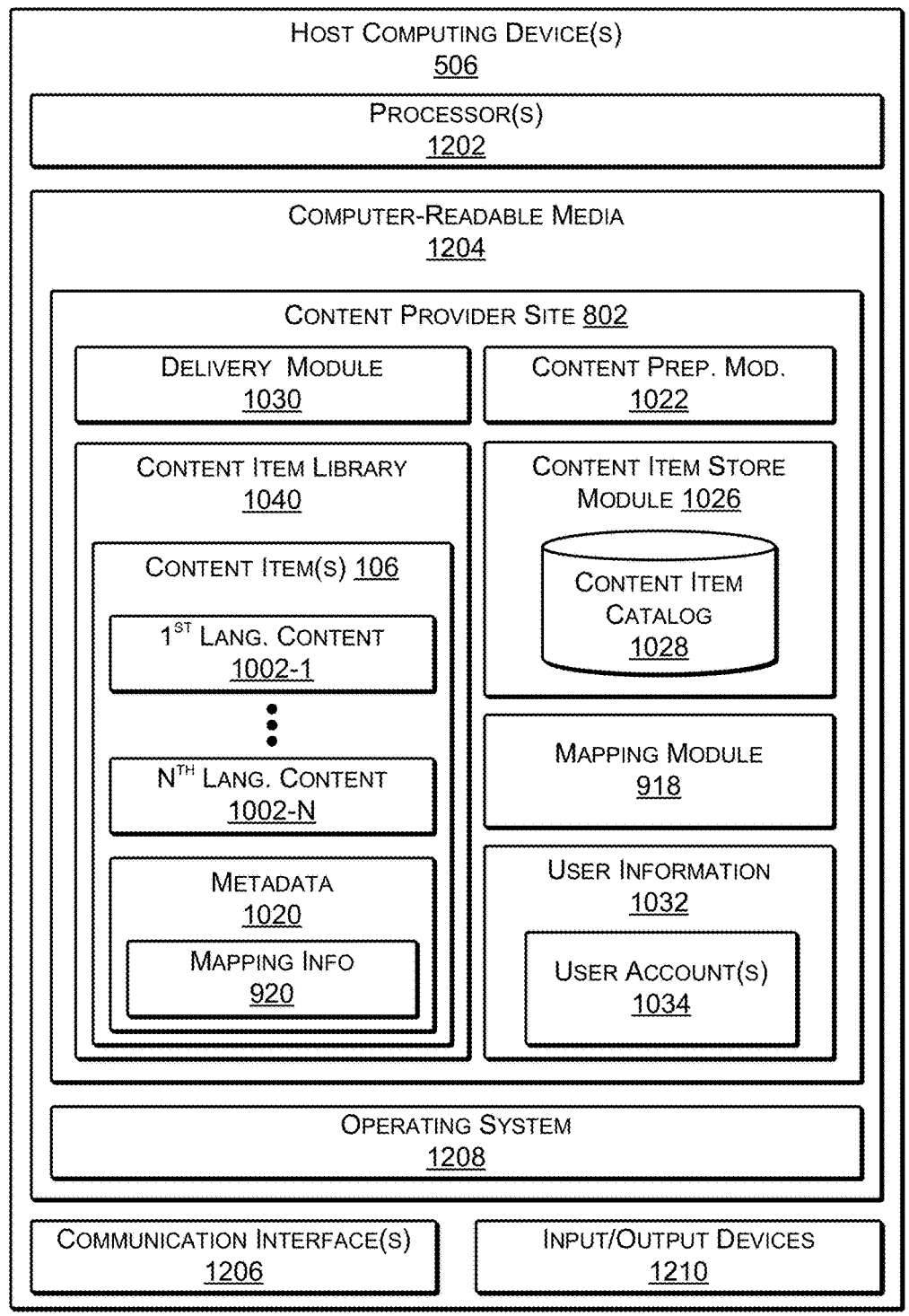
FIG. 12 illustrates select components of one or more example host computing devices of a content provider according to some implementations.

FIG. 12 illustrates select components of one or more host computing devices 1006 that may be used to implement the functionality of the content provider site 1010 according to some implementations. The content provider site 1010 may be hosted on one or more servers or other types of computing devices that may be embodied in any number of ways. For instance, in the case of a server, the content provider site 1010 may be implemented on a single server, a cluster of servers, a server farm or data center, a cloud hosted computing service, and so forth, although other computer architectures (e.g., a mainframe architecture) may also be used. Further, while the figures illustrate the components of the content provider site 1010 as being present in a single location, it is to be appreciated that these components may be distributed across different computing devices and locations in any manner Generally, the content provider site 1010 may be implemented by one or more computing devices, with the various functionality described above distributed in various ways across the different computing devices. The computing devices may be located together or separately, and organized, for example, as virtual servers, server banks and/or server farms. The described functionality may be provided by the servers of a single entity or enterprise, or may be provided by the servers and/or services of multiple entities or enterprises.

As illustrated in FIG. 12, an example host computing device 1006 includes one or more processors 1202, one or more computer-readable media 1204, and one or more communication interfaces 1206. The processor(s) 1202 may be a single processing unit or a number of processing units, and may include single or multiple computing units or multiple processing cores. The processor(s) 1202 can be configured to fetch and execute computer-readable instructions stored in the computer-readable media 1204 or other computer-readable media.

The computer-readable media 1204 may include volatile and nonvolatile memory and/or removable and non-removable media implemented in any type of technology for storage of information, such as computer-readable instructions, data structures, program modules or other data. Such computer-readable media includes, but is not limited to, RAM, ROM, EEPROM, flash memory or other memory technology, CD-ROM, digital versatile disks (DVD) or other optical storage, magnetic cassettes, magnetic tape, solid state storage, magnetic disk storage, RAID storage systems, storage arrays, network attached storage, storage area networks, cloud storage, or any other medium that can be used to store the desired information and that can be accessed by a computing device. Depending on the configuration of the computing device 1006, the computer-readable media 1204 may be a type of computer-readable storage media and may be a tangible non-transitory storage media.

The computer-readable media 1204 may be used to store any number of functional components that are executable by the processors 1202. In many implementations, these functional components comprise instructions or programs that are executable by the processors 1202 and that, when executed, implement operational logic for performing the actions attributed above to the content provider site 1010 and content provider 1004. Functional components of the content provider site 1010 that may be executed on the processors 1202 for implementing the various functions and features related to providing content items and visually distinguished content as described herein, include the content preparation module 1022, the content item store module 1026, the delivery module 1030, and the mapping module 918. Additional functional components stored in the computer-readable media 1204 may include an operating system 1208 for controlling and managing various functions of the host computing device(s) 1006.

In addition, the computer-readable media 1204 may include, or the host computing device(s) 1006 may access, data that may include the content item library 1040, including one or more content items 106 having multiple language content 1002-1, . . . , 1002-N, and metadata 1020, including mapping information 920. The data may further include the user information 1032, including information for one or more user accounts 1034. In addition, the computer-readable media 1204 may store or the host computing devices(s) 1006 may access the content item catalog 1028 used by the content item store module 1026. The host computing device(s) 1006 may also include many other logical, programmatic and physical components, of which those described above are merely examples that are related to the discussion herein.

The communication interface(s) 1206 may include one or more interfaces and hardware components for enabling communication with various other devices, such as the electronic devices 100, over the network(s) 1008. For example, communication interface(s) 1206 may facilitate communication through one or more of the Internet, cable networks, cellular networks, wireless networks (e.g., Wi-Fi, cellular) and wired networks. Various different approaches to implementations described herein can be implemented in various environments. For instance, the network(s) 1008 may include any suitable network, including an intranet, the Internet, a cellular network, a LAN, WAN, VPN or any other network or combination thereof. Components used for such a system can depend at least in part upon the type of network and/or environment selected. Protocols and components for communicating via such networks are well known and will not be discussed herein in detail.

Host computing device(s) 1006 may further be equipped with various input/output devices 1210. Such I/O devices 1210 may include a display, various user interface controls (e.g., buttons, mouse, keyboard, touch screen, etc.), audio speakers, connection ports and so forth.

Various instructions, methods and techniques described herein may be considered in the general context of computer-executable instructions, such as program modules stored on computer storage media and executed by the processors herein. Generally, program modules include routines, programs, objects, components, data structures, etc., for performing particular tasks or implementing particular abstract data types. These program modules, and the like, may be executed as native code or may be downloaded and executed, such as in a virtual machine or other just-in-time compilation execution environment. Typically, the functionality of the program modules may be combined or distributed as desired in various implementations. An implementation of these modules and techniques may be stored on computer storage media or transmitted across some form of communication media.

Example Processes

FIGS. 13-16 illustrate example processes for presenting multiple versions of a content item in different languages according to some implementations. These processes are illustrated as a collection of blocks in logical flow diagrams, which represent a sequence of operations, some or all of which can be implemented in hardware, software or a combination thereof. In the context of software, the blocks represent computer-executable instructions stored on one or more computer-readable media that, when executed by one or more processors, perform the recited operations. Generally, computer-executable instructions include routines, programs, objects, components, data structures and the like that perform particular functions or implement particular abstract data types. The order in which the operations are described should not be construed as a limitation. Any number of the described blocks can be combined in any order and/or in parallel to implement the process, or alternative processes, and not all of the blocks need be executed. For discussion purposes, the processes are described with reference to the architectures, environments and frameworks described in the examples herein, although the processes may be implemented in a wide variety of other architectures, environments or frameworks.

FIG. 13 is a flow diagram illustrating an example process 1300 that may be executed by an electronic device 100 or by a content provider computing device 1006 for multiple language versions of a content item according to some implementations.

At 1302, the device receives a first text portion of a first version of a content item in a first language and a second text portion of a second version of the content item in a second language. For example, the device may receive for processing a first portion of text in the first language and a second portion of text in the second language for determining a mapping between the portions of text.

At 1304, the device determines location information associated with the first text portion and the second text portion. For example, the device may determine the location information, or the location information may already be associated with the first text portion and the second text portion.

At 1306, the device compares one or more words from the first text portion with one or more words from the second text portion to find word or phrase correlations between the first and second text portions. For example, the device may perform a machine translation of at least part of at least one of the first text portions or the second text portions to determine words that correspond to, or otherwise match with, one another between the two text portions. In some examples, rather than comparing individual words, the device may compare phrases of two or more words. For example, phrases of multiple words may be matched up in the two different language versions by comparing phrases and translations of phrases.

At 1308, based at least in part on the comparing, the device creates a mapping that indicates one or more corresponding locations between the first text portion in the first language and the second text portion in the second language. For example, the device may establish a correlation between a location associated with a first text portion and a location associated with a second text portion to create a mapping between the two text portions based, at least in part, on their locations in the respective versions of content. In some examples, the mapping may be a one-way mapping while, in other examples, the mapping may be a two-way mapping so that corresponding portions of text in the other language may be directly identified from either language version.

Figure 14:
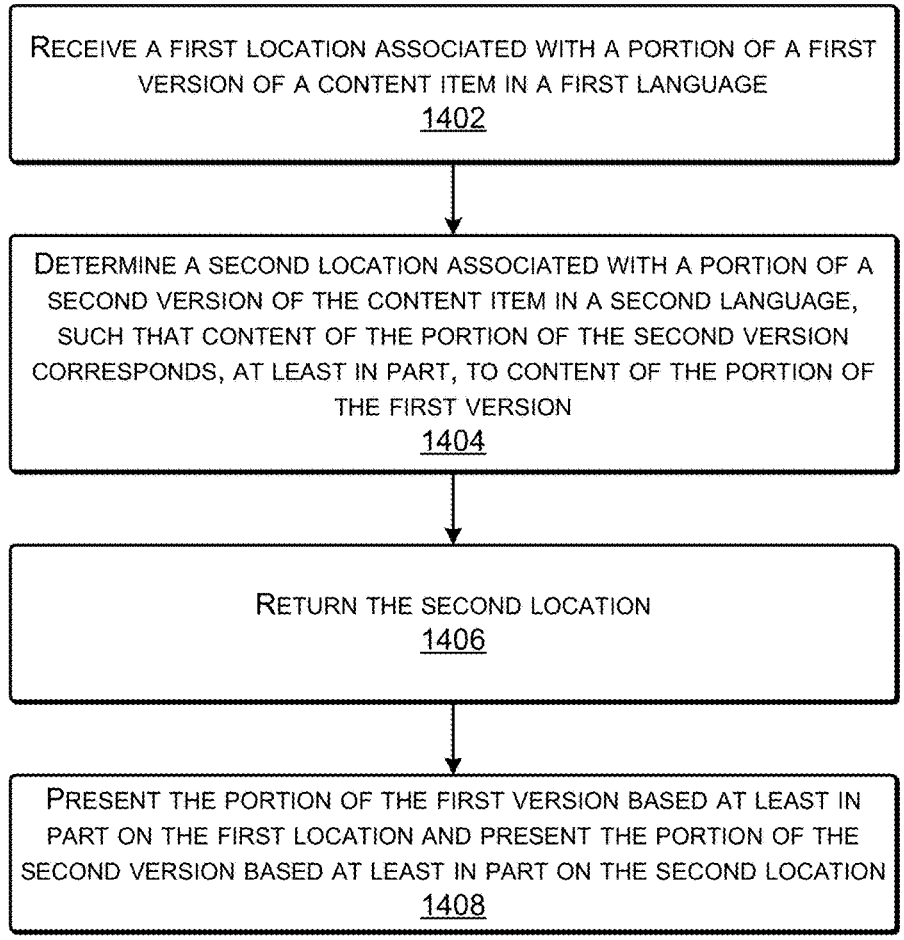
FIG. 14 is a flow diagram illustrating an example process that may be executed by an electronic device for multiple language versions of a content item according to some implementations

FIG. 14 is a flow diagram illustrating an example process 1400 that may be executed by an electronic device 100 for multiple language versions of a content item according to some implementations.

At 1402, the electronic device receives a first location associated with a portion of a first version of a content item in a first language. For example, the user may cause a portion of content from the first version to be displayed on the device thereby indicating a first location associated with the portion.

At 1404, the electronic device determines a second location associated with a portion of the second version of the content item in a second language, such that content of the portion of the second version corresponds, at least in part, to content of the portion of the first version. For example, the electronic device may refer to mapping information or may otherwise determine a location of the portion of content of the second version that corresponds to the portion of content of the first version in content contained therein. For instance, the subject matter or content of the portion of the first version may match the subject matter or content of the portion of the second version, so that subject matter that is not included in the first portion is not included in the second portion, and vice versa.

At 1406, the electronic device returns the second location. For example, the electronic device may return the second location based on the mapping information or other techniques for determining the location of the portion of the second version of the content item.

At 1408, the electronic device presents the portion of the first version based at least in part on the first location and presents the portion of the second version based at least in part on the second location. For example, the electronic device may present a portion of the first version and a corresponding portion of the second version based at least in part on the first location and the second location, respectively, such that the content included in the portion of the second version corresponds or matches, at least in part, the content included in the portion of the first version.

Figure 15:
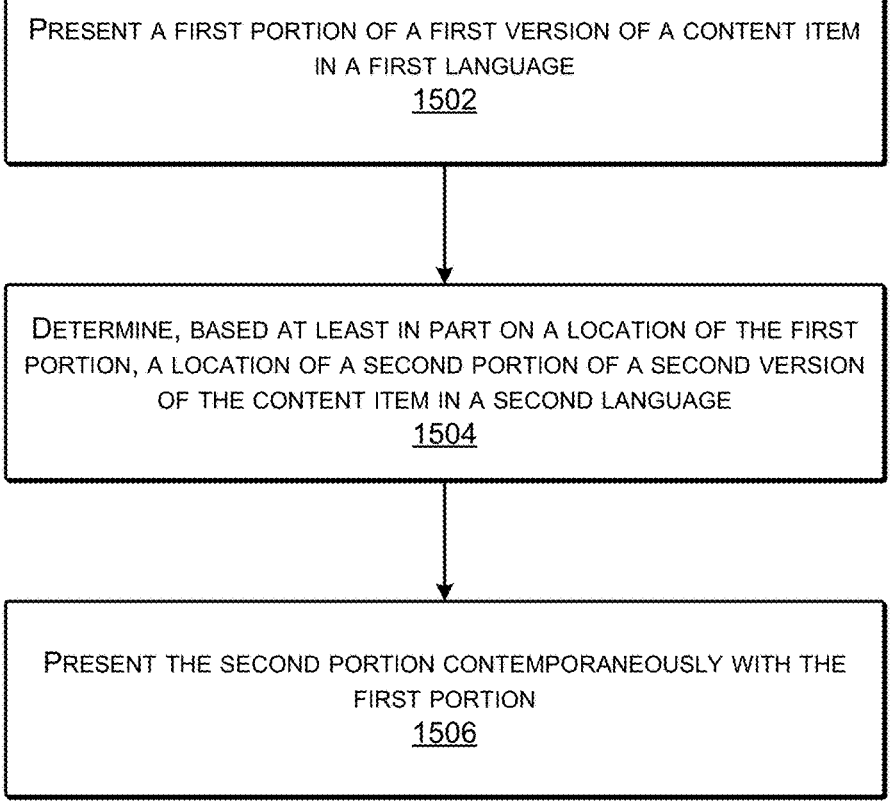
FIG. 15 is a flow diagram illustrating an example process that may be executed by an electronic device for multiple language versions of a content item according to some implementations.

FIG. 15 is a flow diagram illustrating an example process 1500 that may be executed by an electronic device 100 for multiple language versions of a content item according to some implementations.

At 1502, the electronic device presents a first portion of a first version of a content item in a first language. For example, a user may navigate within a first version of a content item in a first language to present a first portion of the first version.

At 1504, the electronic device determines a location of a second portion of a second version of the content item in a second language based, at least in part on a location of the first portion, such that the content of the second portion corresponds to content of the first portion. For example, the electronic device may refer to mapping information or may otherwise locate a second portion of content of a second version of the content item in a second language that corresponds to the first portion in the first language.

At 1506, the electronic device presents the second portion contemporaneously with the first portion. For example, the electronic device may present the first portion and the second portion on a display of the device such as in a side-by-side or above and below fashion. In some examples, the electronic device may automatically adjust an area size that contains the first portion relative to an area size that contains the second portion based upon the amount of content to be included in each area.

Figure 16:
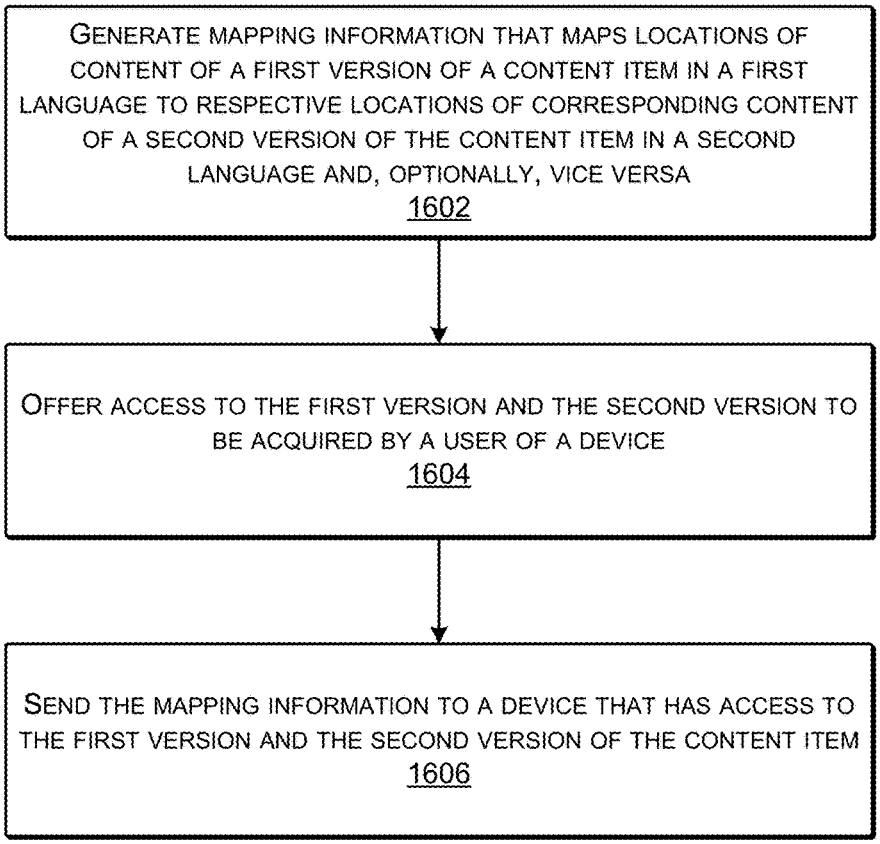
FIG. 16 is a flow diagram illustrating an example process that may be executed by a computing device of a content provider in connection providing a content item in a first language and a second language according to some implementations.

FIG. 16 is a flow diagram illustrating an example process 1600 that may be executed by a computing device of a content provider in connection providing a content item in a first language and a second language according to some implementations.

At 1602, the computing device generates mapping information that maps locations of content of a first version of the content item in a first language to locations of content of a second version of the content item in a second language. For example, based on location information associated with the content of the first version and the content of the second version, the computing device may find correlations between the two versions and may create a mapping between portions of content of the corresponding versions based at least in part on the location information. As mentioned above, there may be a mapping from the portions of the first language version to the corresponding portions of the second language version, and also a mapping from portions of the second language version to the corresponding portions of the first language version. Thus, in some examples, the mapping may be a one-way mapping while, in other examples, the mapping may be a two-way mapping so that corresponding portions of text in the other language may be directly identified from either language version.

At 1604, the computing device offers access to the first version and the second version that may be acquired by a user of a device. For example, the content provider may offer for sale, license, or other acquisition, the first version and the second version of the content item in the two different languages, such as in a bundle, by providing a discount on the second version, or the like.

At 1606, the computing device may send the mapping information (or make the mapping information available for delivery) to a device that has access to the first version and the second version of the content item. For example, a user of an electronic device may purchase the first version and the second version of the content item and may receive the mapping information to enable the first version and the second version to be displayed contemporaneously on the electronic device such as discussed above with respect to the user interfaces 104 and 600.

The example processes described herein are only examples of processes provided for discussion purposes. Numerous other variations will be apparent to those of skill in the art in light of the disclosure herein. Further, while the disclosure herein sets forth several examples of suitable frameworks, architectures and environments for executing the processes, implementations herein are not limited to the particular examples shown and discussed.

Furthermore, this disclosure provides various example implementations, as described and as illustrated in the drawings. However, this disclosure is not limited to the implementations described and illustrated herein, but can extend to other implementations, as would be known or as would become known to those skilled in the art. Reference in the specification to "one implementation," "this implementation," "these implementations" or "some implementations" means that a particular feature, structure, or characteristic described is included in at least one implementation, and the appearances of these phrases in various places in the specification are not necessarily all referring to the same implementation.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as example forms of implementing the claims.

What is claimed is:

1. One or more non-transitory computer-readable media maintaining instructions executable by one or more processors to perform operations comprising:
   receiving a first text portion of a first version of a content item in a first language and a second text portion of a second version of the content item in a second language, wherein the second language is different from the first language;
   generating first token information based at least in part on the first text portion of the first version of the content item, the first token information including at least a first token corresponding to a first word in the first text portion;
   determining a first location sequence for the first token, the first location sequence including a first numerical offset corresponding to a start location for the first word in the first word version and a second numerical offset corresponding to an end location for the first word in the first version;
   generating second token information based at least in part on the second text portion of the second version of the content item, the second token information including at least a second token corresponding to a second word in the second text portion;
   determining a second location sequence for the second token, the second location sequence including a third numerical offset corresponding to a start location for the second word in the second word version and a fourth numerical offset corresponding to an end location for the second word in the second version;
   identifying, based at least in part on the first token information and the second token information, at least one of a word correlation or a phrase correlation between the first and second text portions;
   based at least in part on the identifying, generating mapping information that indicates an association between the first word of the first text portion and the second word of the second text portion based at least in part on the first location sequence of the first token and the second location sequence of the second token; and
   sending the mapping information to a device.

2. The one or more non-transitory computer-readable media as recited in claim 1, the operations further comprising:
   receiving a translation of the first word from the first text portion into the second language, wherein the first token corresponds to the first word in the second language; and
   comparing the first token and the second token to find the at least one of the word correlation or the phrase correlation.

3. The one or more non-transitory computer-readable media as recited in claim 1, wherein generating the mapping information is further based, at least in part, on at least one of:
   a location of a punctuation mark;
   a location of a sentence beginning point;
   a location of a sentence ending point;
   a location of a paragraph beginning point;
   a location of a paragraph ending point; or
   a location of a chapter break.

4. The one or more non-transitory computer-readable media as recited in claim 1, wherein the mapping information associates the first numerical offset corresponding to the start location of the first word with the third numerical offset corresponding to the start location of the second word and the second numerical offset corresponding to the end location of the first word with the fourth numerical offset corresponding to the end location of the second word.

5. The one or more non-transitory computer-readable media as recited in claim 1, wherein:
   the first numerical offset corresponds to a number of characters within the first text portion the first version to reach a first character of the first word;
   the second numerical offset corresponds to a number of characters within the first text portion of the first version to reach a last character of the first word;
   the third numerical offset corresponds to a number of characters within the second text portion of the second version to reach a first character of the second word; and
   the fourth numerical offset corresponds to a number of characters within the second text portion of the second version to reach a last character of the second word.

6. A method comprising:
   under control of one or more processors configured with executable instructions,
   receiving a first location associated with a portion of a first version of a content item, the portion of the first version being in a first language;
   determining a second location associated with a portion of a second version of the content item, the portion of the second version being in a second language, wherein:
      the second language is different from the first language, and
      content of the portion of the second version corresponds, at least in part, to content of the portion of the first version;
   returning the second location;
   presenting a first amount of the content of the portion of the first version in a first area;
   presenting a first amount of the content of the portion of the second version in a second area;
   determining a second amount of the content of the portion of the first version to present within the first area;
   determining a second amount of the content of the portion of the second version to present based at least in part on associating the second amount of the content of the portion of the second version with the second amount of the content of the portion of the first version; and
   adjusting a size of the second area based at least in part on the second amount of the content of the portion of the second version.

7. The method as recited in claim 6, the determining the second location further comprising accessing mapping information that maps the first location to the second location.

8. The method as recited in claim 7, wherein accessing the mapping information that maps the first location to the second location comprises accessing mapping information that maps the first location to the second location based on at least one of:
   a location of a sentence in the first version that corresponds to a sentence in the second version; or
   a location of a word in the first version that correspond to a word in the second version.

9. The method as recited in claim 6, the determining the second location further comprising:
   translating the portion of the first version into the second language; and
   comparing the translated portion of the first version with the content of the second version to determine the second location.

10. The method as recited in claim 6, wherein presenting the portion of the first version and presenting the portion of the second version further comprises presenting the portion of the second version on a display adjacent to the portion of the first version.

11. The method as recited in claim 10, wherein presenting the portion of the second version on the display adjacent to the portion of the first version further comprises at least one of:
   displaying the portion of the first version and the portion of the second version side by side; or
   displaying the portion of the first version and the portion of the second version one above the other.

12. The method as recited in claim 10, wherein presenting the portion of the second version on the display adjacent to the portion of the first version further comprises presenting a single instance of an image included in the first version and the second version.

13. The method as recited in claim 10, wherein presenting the portion of the second version on the display adjacent to the portion of the first version further comprises:
   visually distinguishing a term included in the portion of the first version from other text of the portion of the first version; and
   visually distinguishing a corresponding term included in the portion of the second version from other text of the portion of second version.

14. The method as recited in claim 10, wherein presenting the portion of the second version on the display adjacent to the portion of the first version further comprises:
   receiving a first annotation to the portion of the first version; and
   presenting a second annotation in association with the portion of the second version based at least in part on the first annotation, wherein the first annotation and the second annotation comprise at least one of:
      highlighting of text;
      a note entered by a user; or
      a bookmark.

15. The method as recited in claim 10, further comprising:
   hiding the portion of the first version or the portion of the second version in response to receiving an input; and
   displaying an indicator to indicate that the hidden portion of the first version or the hidden portion of the second version is available to be unhidden.

16. The method as recited in claim 10, wherein presenting the content of the portion of the second version on the display adjacent to the portion of the first version comprises presenting subject matter of the portion of the second version on the display adjacent to corresponding subject matter of the content of the portion of the first version.

17. The method as recited in claim 6, further comprising sending, over a network, position information indicating the first location and the second location.

18. The method as recited in claim 6, further comprising:
   presenting the second amount of the content the portion of the first version within the first area allocated to the first version; and
   presenting the second amount of the content the portion of the second version within the second area allocated to the second version.

19. The method of claim 6, further comprising adjusting a size of the first area based at least in part on adjusting the size of the second area.

20. A device comprising:
   one or more processors;
   one or more computer-readable media; and
   one or more modules maintained on the one or more computer-readable media and executed by the one or more processors to perform acts comprising:
      presenting, in a first area, a first amount of content of a first portion of a first version of a content item;
      determining, based at least in part on a location of the first portion, a location of a second portion of a second version of the content item, wherein the first portion of the first version is composed in a different language than the second portion of the second version;
      presenting, in a second area, a second amount of content of the second portion of the second version of the content item;
      determining a new first amount of content of the first portion of the first version of the content item to present within the first area;
      determining a new second amount of content of the second portion of the second version to present, the new second amount of content based at least in part on associating the new second amount of content of the second portion of the second version with the new first amount of content of the first portion of the first version; and
      modifying a size of the second area based at least in part on the new second amount of content of the second portion of the second version of the content item.

21. The device as recited in claim 20, wherein presenting the second portion with the first portion comprises:
   presenting first text associated with the first portion in the first area on a display; and
   presenting second text associated with the second portion in the second area on the display.

22. The device as recited in claim 21, the acts further comprising determining the first area to allocate to the first portion based at least in part on the first amount of content of the first portion and the second amount of content of the second portion.

23. The device as recited in claim 21, the acts further comprising modifying a size of the first area based at least in part on modifying the size of the second area.

24. The device as recited in claim 20, wherein modifying the size of the second area includes at least one of:
   reducing the size of the second area relative to a size of the first area; or
   hiding the second area.

25. The device as recited in claim 20, the acts further comprising:
   presenting, with the first portion and the second portion, a third portion of a third version of the content item, wherein:
      the third version is composed in a different language than the first version and the second version; and
      content of the third portion corresponds to content of the first portion and content of the second portion.

26. The device as recited in claim 20, wherein:
   the first version is in a text format; and
   the second version is in an audio format.

27. A system comprising:
one or more processors;
one or more computer readable media maintaining one or more modules executable by the one or more processors to perform operations comprising:
  receiving a first version and a second version of a content item, wherein the first version is composed of a different language than the second version;
  determining first location information for a first word within content of the first version of the content item, the first location information including a first numerical offset corresponding to a first start location and a second numerical offset corresponding to a first end location of the first word within the content of the first version of the content item;
  determining second location information for a second word within content of the second version of the content item, the second location information including a third numerical offset corresponding to a second start location and a fourth numerical offset corresponding to a second end location of the second word within the content of the second version of the content item;
  generating mapping information that includes the first location information and the second location information, wherein the mapping information associates the first location information of the first word within the content of the first version of the content item with the second location information of the second word within the content of the second version of the content; and
  sending the mapping information to a device that has access to the first version and the second version of the content item.

28. The system as recited in claim 27, the operations further comprising offering access to the first version and the second version as a bundle to be accessed by the device.

29. The system as recited in claim 27, wherein generating the mapping information further comprises:
  receiving the first word from the first version translated into a language of the second version;
  comparing the first word from the first version translated into the language of the second version with the second word of the second version to find at least one of a word correlation or a phrase correlation; and
  mapping the first location information of the first word from the first version to the second location information of the second word of the second version.

30. The system as recited in claim 27, wherein:
  the first numerical offset corresponds to a number of characters within the content of the first version to reach a first character of the first word;
  the second numerical offset corresponds to a number of characters within the content of the first version to reach a last character of the first word;
  the third numerical offset corresponds to a number of characters within the content of the second version to reach a first character of the second word; and
  the fourth numerical offset corresponds to a number of characters within the content of the second version to reach a last character of the second word.

31. The system as recited in claim 27, wherein the mapping information associates the first numerical offset corresponding to the first start location of the first word with the third numerical offset corresponding to the second start location of the second word and the second numerical offset corresponding to the first end location of the first word with the fourth numerical offset corresponding to the second end location of the second word.

* * * * *